US010913827B2

(12) United States Patent
Kuzeljevic et al.

(10) Patent No.: US 10,913,827 B2
(45) Date of Patent: Feb. 9, 2021

(54) PROCESS FOR THE MANUFACTURE OF FLAME RETARDANT POLYCARBONATE PARTICLES AND FLAME RETARDANT POLYCARBONATE PARTICLES PREPARED THEREBY

(71) Applicant: SABIC GLOBAL TECHNOLOGIES B.V., Bergen op Zoom (NL)

(72) Inventors: Zeljko Kuzeljevic, Evansville, IN (US); Viswanathan Kalyanaraman, Newburgh, IN (US); Rahul Patil, Evansville, IN (US); Kapil Inamdar, Chester Springs, PA (US); Zachary Anderson, Evansville, IN (US); William E. Hollar, Mount Vernon, IN (US); Sasi Sethumadhavan Kannamkumarath, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/629,115

(22) PCT Filed: Sep. 7, 2018

(86) PCT No.: PCT/US2018/049897
§ 371 (c)(1),
(2) Date: Jan. 7, 2020

(87) PCT Pub. No.: WO2019/060146
PCT Pub. Date: Mar. 28, 2019

(65) Prior Publication Data
US 2020/0223989 A1    Jul. 16, 2020

Related U.S. Application Data

(60) Provisional application No. 62/561,803, filed on Sep. 22, 2017.

(51) Int. Cl.
C08J 3/14 (2006.01)
C08J 3/20 (2006.01)
C08K 5/5333 (2006.01)
C08K 5/5399 (2006.01)

(52) U.S. Cl.
CPC ............ *C08J 3/14* (2013.01); *C08J 3/203* (2013.01); *C08K 5/5333* (2013.01); *C08K 5/5399* (2013.01); *C08J 2369/00* (2013.01)

(58) Field of Classification Search
USPC .................................................. 528/196, 198
See application file for complete search history.

(56) References Cited

U.S. PATENT DOCUMENTS

| | | | |
|---|---|---|---|
| 3,929,908 A | 12/1975 | Orlando et al. | |
| 3,954,713 A | 5/1976 | Schnoring et al. | |
| 4,154,775 A | 5/1979 | Axelrod | |
| 4,170,711 A | 10/1979 | Orlando et al. | |
| 4,923,933 A | 5/1990 | Curry | |
| 5,196,507 A | 3/1993 | Totani et al. | |
| 6,489,372 B1 | 12/2002 | He et al. | |
| 6,528,611 B2 | 3/2003 | Vodermayer et al. | |
| 6,861,499 B2 | 3/2005 | Vinciguerra et al. | |
| 7,816,486 B2 | 10/2010 | Freitag et al. | |
| 8,119,715 B2 | 2/2012 | Monsheimer et al. | |
| 9,181,395 B2 | 11/2015 | Kalayaraman et al. | |
| 10,377,863 B2 | 8/2019 | Kalyanaraman et al. | |
| 10,465,049 B2 | 11/2019 | Kalyanaraman | |
| 2005/0027047 A1 | 2/2005 | Monsheimer et al. | |
| 2006/0100393 A1 | 5/2006 | Hale et al. | |
| 2014/0272430 A1 | 9/2014 | Kalayaraman | |
| 2014/0295363 A1 | 10/2014 | Sun et al. | |
| 2018/0244863 A1 | 8/2018 | Leenders | |
| 2019/0338124 A1 | 11/2019 | Li et al. | |

FOREIGN PATENT DOCUMENTS

| | | |
|---|---|---|
| CN | 101321810 A | 12/2008 |
| CN | 101935444 A | 1/2011 |
| CN | 105440624 A | 3/2016 |
| EP | 2810973 A1 | 12/2014 |
| JP | 2004168941 A | 6/2004 |
| JP | 2004352749 A | 12/2004 |
| WO | 2013175448 A1 | 11/2013 |
| WO | 2014072923 A1 | 5/2014 |
| WO | 2016134224 A1 | 8/2016 |
| WO | 2016156222 A1 | 10/2016 |
| WO | 2017003809 A1 | 1/2017 |
| WO | 2017004112 A1 | 1/2017 |
| WO | 2017004140 A1 | 1/2017 |

(Continued)

OTHER PUBLICATIONS

International Preliminary Report on Patentability for the corresponding PCT/US2018/049897; International Filing Date: Sep. 7, 2018; dated Sep. 11, 2019; 22 pages.

(Continued)

*Primary Examiner* — Terressa Boykin
(74) *Attorney, Agent, or Firm* — Cantor Colburn LLP

(57) ABSTRACT

A process for the manufacture of polycarbonate particles is disclosed herein. The process includes combining a first solution including a polycarbonate and a phosphorus-containing flame retardant or a flame retardant polycarbonate, and an organic solvent with a second solution including a surfactant and an aqueous solvent substantially immiscible with the organic solvent, under conditions of shear and temperature effective to provide an emulsion. At least a portion of the organic solvent is removed from the emulsion to provide an aqueous slurry having a plurality of particles, wherein the particles include the polycarbonate and the phosphorus-containing flame retardant or the flame retardant polycarbonate.

20 Claims, 4 Drawing Sheets

(56) References Cited

FOREIGN PATENT DOCUMENTS

WO 2017040887 A1 3/2017
WO 2018106525 A1 6/2018

OTHER PUBLICATIONS

International Search Report for the corresponding PCT/US2018/049897; International Filing Date: Sep. 7, 2018; dated Dec. 14, 2018; 7 pages.
Written Opinion for the corresponding PCT/US2018/049897; International Filing Date: Sep. 7, 2018; dated Dec. 14, 2018; 10 pages.

PROCESS FOR THE MANUFACTURE OF FLAME RETARDANT POLYCARBONATE PARTICLES AND FLAME RETARDANT POLYCARBONATE PARTICLES PREPARED THEREBY

CROSS-REFERENCE TO RELATED APPLICATIONS

This application is a National Stage application of PCT/US2018/049897, filed Sep. 7, 2018, which claims benefit of U.S. Provisional Application No. 62/561,803 filed on Sep. 22, 2017, both of which are incorporated by reference herein in their entirety.

BACKGROUND

High performance polymers such as polycarbonate can be made into ultra-fine powders, for example, powders comprising particles having a diameter of less than or equal to 100 micrometers (μm), by emulsifying the polymer in an organic solvent and water, and further removing the organic solvent from the emulsion, for example, through distillation. However, particles made by such a process can result in poor yield of the particles. In addition, achieving particles having an average size of less than 100 μm and narrow particle distributions remains a challenge using known techniques.

Accordingly, there is a need for an optimized process to obtain spherical polycarbonate particles having a desired size and in high yield for commercial feasibility. It would be a further advantage to provide flame retardant polycarbonate particles. Furthermore, as surfactants are generally used in the emulsion process, it can be important to quantify the residual surfactants, and limit them to a certain amount in the final product so as not to significantly adversely affect the properties. Applications including composites, additive manufacturing and powder coating can benefit from such polycarbonate particles.

BRIEF DESCRIPTION

A process for the manufacture of polycarbonate particles comprises combining a first solution comprising (i) a polycarbonate and a phosphorus-containing flame retardant or a flame retardant polycarbonate, and (ii) an organic solvent with a second solution comprising (i) a surfactant and (ii) an aqueous solvent immiscible with the organic solvent, under conditions of shear and temperature effective to provide an emulsion; and removing at least a portion of the organic solvent to provide an aqueous slurry comprising a plurality of particles comprising the polycarbonate and the phosphorus-containing flame retardant.

Polycarbonate particles comprising a phosphorus-containing flame retardant or a flame retardant polycarbonate and articles comprising the particles are also described.

The above described and other features are exemplified by the following figures and detailed description.

BRIEF DESCRIPTION OF THE DRAWINGS

The following figures represent exemplary embodiments.

DETAILED DESCRIPTION

Figure 2:
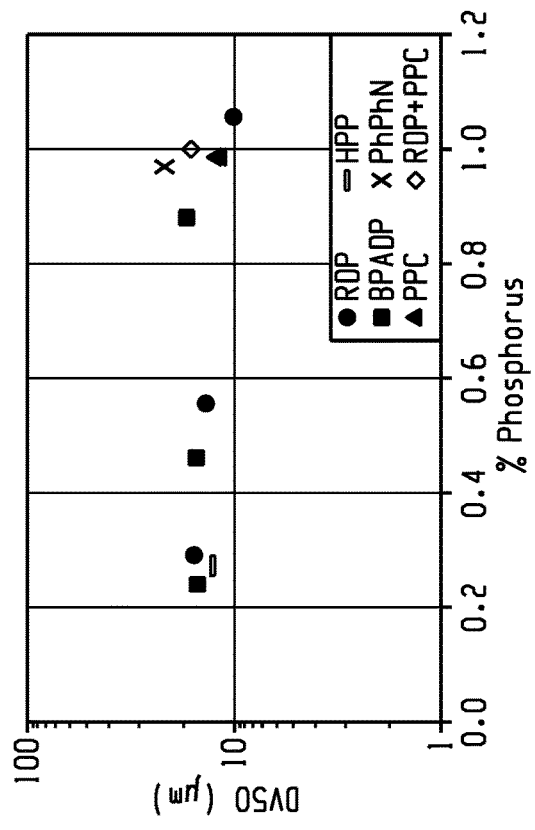
FIG. 2 shows the effect of phosphorus flame retardant loading on the Dv50 of the polymer particles of Examples 1-11.

Disclosed herein is a process for the manufacture of flame retardant polycarbonate particles. The process relies on the formation of an aqueous polymer dispersion from an emulsion. Using the process described herein, flame retardant polycarbonate particles having an average size (by volume) of 5 to 60 micrometers can be obtained in high yields (e.g., greater than 75%) and with a high degree of flame retardant retention within the particles (e.g., 90% or greater). The present inventors have discovered that varying process parameters including amount of the flame retardant component can impact the resulting polycarbonate particle size and distribution, as well as the overall yield of the process. Accordingly, the present inventors have identified an optimized process for the preparation of flame retardant polycarbonate particles.

Accordingly, an aspect of the present disclosure is a process for the manufacture of polycarbonate particles. The process can advantageously provide polycarbonate particles in high yield, and having a particular average size, size distribution, phosphorus content, and residual surfactant content. Furthermore, the flame retardant polycarbonate particles can have a glass transition temperature of less than or equal to 140° C., which can facilitate further processing of the particles.

The process includes combining a first solution comprising a polycarbonate and a phosphorus-containing flame retardant or a flame retardant polycarbonate and an organic solvent with a second solution comprising an aqueous solvent that is substantially immiscible with the organic solvent and a surfactant to provide an emulsion.

The first solution can be prepared by dissolving a polycarbonate and the phosphorus-containing flame retardant or the flame retardant polycarbonate composition in an organic solvent to form the first solution. As used herein, the term "polycarbonate" includes homopolycarbonates, copolycarbonates, polycarbonate copolymers, and combinations comprising at least one of the foregoing. Polycarbonates include repeating structural carbonate units of the formula (1)

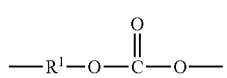

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

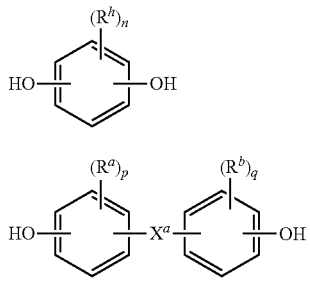

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{1-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

In some embodiments, $X^a$ can be a substituted $C_{3-18}$ cycloalkylidene of formula (4)

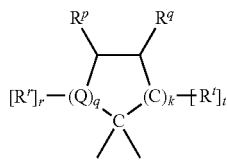

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and q is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone, or Q can be —N(Z)— wherein Z is phenyl.

Bisphenols wherein $X^a$ is a cycloalkylidene of formula (4) can be used in the manufacture of polycarbonates containing phthalimidine carbonate units of formula (1a)

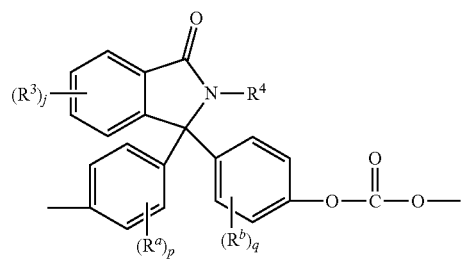

wherein $R^a$, $R^b$, p, and q are as in formula (3), $R^3$ is each independently a $C_{1-6}$ alkyl, j is 0 to 4, and $R_4$ is hydrogen, $C_{1-6}$ alkyl, or a substituted or unsubstituted phenyl, for example a phenyl substituted with up to five $C_{1-6}$ alkyls. For example, the phthalimidine carbonate units are of formula (1b)

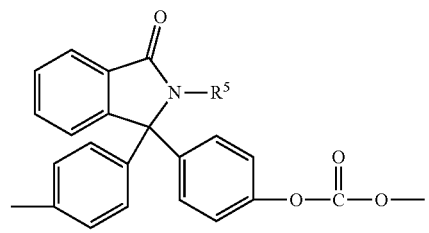

wherein $R^5$ is hydrogen, phenyl optionally substituted with up to five 5 $C_{1-6}$ alkyls, or $C_{1-4}$ alkyl. In an embodiment in formula (1b), $R^5$ is hydrogen, methyl, or phenyl, specifically phenyl. Carbonate units (1b) wherein $R^5$ is phenyl can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

Some illustrative examples of dihydroxy compounds that can be used are described, for example, in WO 2013/175448 A1, U.S. 2014/0295363, and WO 2014/072923. Exemplary dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxy-3-methylphenyl)-3,3,5-trimethylcyclohexane (isophorone bisphenol). Copolycarbonates have at least two different types of carbonate units, for example BPA units and isophorone bisphenol units.

"Polycarbonate" as used herein also includes copolymers, for example, including carbonate units and ester units ("poly(ester-carbonate)s", also known as polyester-polycarbonates). Poly(ester-carbonate)s further contain, in addition to recurring carbonate chain units of formula (1), repeating ester units of formula (5)

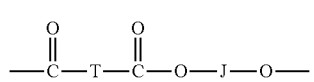
(5)

wherein J is a divalent group derived from a dihydroxy compound (which includes a reactive derivative thereof), and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene. Copolyesters containing a combination of different T or J groups can be used. The polyester units can be branched or linear.

Specific dihydroxy compounds include aromatic dihydroxy compounds of formula (2) (e.g., resorcinol), bisphenols of formula (3) (e.g., bisphenol A), a $C_{1-8}$ aliphatic diol such as ethane diol, n-propane diol, i-propane diol, 1,4-butane diol, 1,6-cyclohexane diol, 1,6-hydroxymethylcyclohexane, or a combination comprising at least one of the foregoing dihydroxy compounds. Aliphatic dicarboxylic acids that can be used include $C_{6-20}$ aliphatic dicarboxylic acids (which includes the terminal carboxyl groups), specifically linear $C_{8-12}$ aliphatic dicarboxylic acid such as decanedioic acid (sebacic acid); and alpha, omega-$C_{12}$ dicarboxylic acids such as dodecanedioic acid (DDDA). Aromatic dicarboxylic acids that can be used include terephthalic acid, isophthalic acid, naphthalene dicarboxylic acid, 1,6-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Exemplary ester units include ethylene terephthalate units, n-proplyene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example 1:99 to 99:1. Within this range, the molar ratio of ester units to carbonate units can be 10:90 to 90:10, or 25:75 to 75:25, or 2:98 to 15:85. In some embodiments the molar ratio of ester units to carbonate units in the poly(ester-carbonate)s can vary from 1:99 to 30:70, or from 2:98 to 25:75, or from 3:97 to 20:80, or from 5:95 to 15:85.

In some embodiments, the polycarbonate is a bisphenol A homopolycarbonate, poly(carbonate-siloxane), poly(aromatic ester-carbonate), poly(aliphatic ester-carbonate), poly(aromatic ester-carbonate-siloxane), poly(bisphenol A-2-phenyl-3,3'-bis(4-hydroxyphenyl) phthalimidine carbonate), poly(bisphenol A-1,1-bis(4-hydroxy-3-methylphenyl)cyclohexane carbonate), or a combination comprising at least one of the foregoing.

In a specific embodiment, the polycarbonate is a linear homopolymer containing bisphenol A carbonate units (BPA-PC), commercially available under the trade name LEXAN from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN CFR from SABIC. In some embodiments, the polycarbonate can include a combination of more than one polycarbonate, for example, more than one homopolycarbonate. A combination of a linear polycarbonate and a branched polycarbonate can be used. It is also possible to use a polycarbonate copolymer or interpolymer rather than a homopolymer. Polycarbonate copolymers can include copolycarbonates comprising two or more different types of carbonate units, for example units derived from BPA and PPPBP (commercially available under the trade name LEXAN XHT from SABIC); BPA and DMBPC (commercially available under the trade name DMX from SABIC); or BPA and isophorone bisphenol (commercially available under the trade name APEC from Bayer).

A particular copolycarbonate includes bisphenol A and bulky bisphenol carbonate units, i.e., derived from bisphenols containing at least 12 carbon atoms, for example 12 to 60 carbon atoms or 20 to 40 carbon atoms. Examples of such copolycarbonates include copolycarbonates comprising bisphenol A carbonate units and 2-phenyl-3,3'-bis(4-hydroxyphenyl) phthalimidine carbonate units (a BPA-PPPBP copolymer, commercially available under the trade name XHT from SABIC).

Polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_1$-$C_{22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyDisopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimeric acid, and benzophenone tetracarboxylic acid. The branching agents can be added at a level of 0.05 to 2.0 wt. %. Combinations comprising linear polycarbonates and branched polycarbonates can be used.

When the first solution comprises the polycarbonate, a phosphorus-containing flame retardant is also included. The phosphorus-containing flame retardant can include an aromatic group, a phosphorus-nitrogen bond, or a combination comprising at least one of the foregoing. For example, the phosphorus-containing flame retardant can be an organic phosphate or an organic compound containing phosphorus-nitrogen bonds.

In some embodiments, the phosphorus-containing flame retardant is an aryl phosphate having a molecular weight of about 350 to 1000 grams per mole.

An exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates can be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds can be useful, for example, compounds of the following formulas

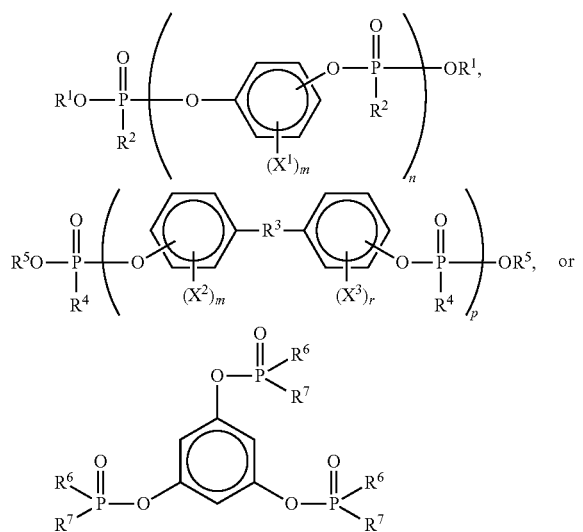

wherein $R^1$, $R^3$ and $R^5$ are, independently, hydrocarbon; $R^2$, $R^4$, $R^6$ and $R^7$ are, independently, hydrocarbon or hydrocarbonoxy; $X^1$, $X^2$ and $X^3$ are halogen; m and r are 0 or integers from 1 to 4, and n and p are from 1 to 30. Examples of suitable di- or polyfunctional aromatic phosphorus-containing compounds include resorcinol tetraphenyl diphosphate (RDP, also known as resorcinol bis (diphenyl phosphate)), the bis(diphenyl)phosphate of hydroquinone and the bis (diphenyl)phosphate of bisphenol-A (BPA-DP), respectively, their oligomeric and polymeric counterparts, and the like.

The phosphorus-containing flame retardant can be an organic compound containing a phosphorus-nitrogen bond, for example, phosphazenes, phosphonitrilic chloride, phosphorus ester amides, phosphoric acid amides, phosphonic acid amides, phosphinic acid amides, tris(aziridinyl) phosphine oxide, or tetrakis(hydroxymethyl) phosphonium chloride. These flame-retardant additives are commercially available.

In some embodiments, the phosphorus-containing flame retardant can be a polyphosphonate or a copolyphosphonate. The polyphosphonate can generally be a polyphosphonate that is known in the art, including, but not limited to those described in U.S. Pat. Nos. 6,861,499 and 7,816,486. Polyphosphonates can exhibit at least one of a broad molecular weight distribution with polydispersities of 3.2 or greater, 2.5 or greater, and 2.3 or greater, an $M_w$ of greater than 10,000 grams per mole using polystyrene standards, and a Tg of at least 100° C. In some embodiments, the polyphosphonates can have a Tg of 25 to 140° C., or 50 to 135° C., or 75 to 130° C. The polyphosphonates can be prepared from an aryl phosphonic acid ester and bisphenol A or a mixture of bisphenol A and other bisphenols and a phosphonium catalyst or an alkyl metal catalyst such as a sodium catalyst, and can have a relative viscosity of at least 1.1, transparency, and improved hydrolytic stability. Such polyphosphates may be branched polyphosphonates or linear or cyclic.

Exemplary copolyphosphonates can include poly(phosphonate-co-carbonate), and can include block or random copolyphosphonates. The constituent components of such copolyphosphonates can include any type of phosphonate and carbonate components. The phosphonate and carbonate content of the copolyphosphonates can vary among embodiments, and embodiments are not limited by the phosphonate or carbonate content or range of phosphonate or carbonate content. For example, in some embodiments, the copolyphosphonates can have a phosphorus content of 1 to 15% by weight of the total copolyphosphonate, for example 1 to 12 wt %, or 2 to 10 wt %

In some embodiments, the phosphorus-containing flame retardant includes a monomeric or polymeric phosphate, phosphite, phosphonate, phosphinate, phosphine oxide, or phosphine, each containing a $C_{3-30}$ aromatic group optionally comprising up to three heteroatoms in an aromatic ring, a phosphazene, phosphorus ester amide, phosphoric acid amide, phosphonic acid amide, phosphinic acid amide, tris(aziridinyl) phosphine oxide, or a combination comprising at least one of the foregoing.

The phosphorus-containing flame retardant can preferably be a polyphosphonate-co-carbonate, phosphorus-containing homopolymer, resorcinol diphosphate, bisphenol A bis(diphenyl phosphate), triphenyl phosphate, resorcinol bis(diphenyl phosphate), tricresyl phosphate, a phenol/bi-phenol polyphosphate, phenoxyphosphazene, or a combination comprising at least one of the foregoing.

Advantageously, the polycarbonate particles prepared according to the method described herein can retain greater than 90% of the phosphorus-containing flame retardant, relative to the amount of phosphorus-containing flame retardant present in the first solution prior to formation of the particles. The amount of phosphorus-containing flame retardant additive can be determined, for example, using inductively coupled plasma-atomic emission spectroscopy or inductively coupled plasma-mass spectrometry, as described in the working examples below.

In some embodiments, the first solution can further include an additive in addition to the polycarbonate and the phosphorus-containing flame retardant. Exemplary additives can include an antioxidant, a stabilizer, an anti-drip agent (e.g., a PTFE-encapsulated styrene-acrylonitrile copolymer (TSAN)), a colorant (e.g., a dye or pigment), and a mold release agent. Additives can include aqueous polymer dispersions or emulsions comprising polymers that are different from the polycarbonate discussed above. Examples include poly(tetrafluoroethylene) (PTFE) emulsions, (meth)acrylic emulsions, and the like. An additive or combination of additives can be included in amounts that are generally known to be effective. The polycarbonate, the phosphorus-containing flame retardant, and the one or more additives can be added individually to the first solution. Alternatively, the polycarbonate, the phosphorus-containing flame retardant, and the one or more additives can be premixed and compounded prior to dissolution in the solvent to provide the first solution. Advantageously, the one or more additives incorporated into the first solution can be incorporated into the resulting polycarbonate particles. For example, the polycarbonate particles can comprise an additive in an amount of 0.001 to 25.0 wt %, or 0.01 to 10 wt %, based on the weight of the polycarbonate particles. In an embodiment, the polycarbonate particles can comprise a dye or pigment in an amount of 0.001 to 25.0 wt %, or 0.01 to 10 wt %, based on the weight of the polycarbonate particles.

In some embodiments, flame retardants other than the phosphorus-containing flame retardant described above can be excluded from the process of making the polycarbonate particles disclosed herein. For example, halogenated flame retardants can be excluded from the polycarbonate particles. Thus, the polycarbonate particles can be essentially free of chlorine and bromine. "Essentially free of chlorine and bromine" is defined as having a bromine or chlorine content of less than or equal to 100 parts per million by weight (ppm), less than or equal to 75 ppm, or less than or equal to 50 ppm, based on the total parts by weight of the particles, excluding any filler.

The polycarbonate and the phosphorus-containing flame retardant can be present in a weight ratio of 99:1 to 50:50, for example 98:2 to 75:25, or 97:3 to 67:33. The phosphorus-containing flame retardant can be present in the first solution in an amount effective to provide 0.05 to 5 weight percent of phosphorus, or 0.1 to 4.0 weight percent, or 0.2 to 3.0 weight percent, or 0.2 to 1.2 weight percent, or 0.2 to 1.0 weight percent, or 0.2 to 0.9 weight percent of phosphorus, based on the combined weight of the polycarbonate and the phosphorus-containing flame retardant.

The first solution can alternatively comprise a flame retardant polycarbonate. When a flame retardant polycarbonate is used, the phosphorus-containing flame retardant need not necessarily be present to achieve the desired flame retardant properties. For example, a flame retardant polycarbonate can include a brominated polycarbonate. Brominated polycarbonate can have a bromine content of 24 wt % to 28 wt % (e.g., 25 wt %). Suitable brominated polycarbonates can be high molecular weight, flame retardant, thermoplastic, aromatic polymers having a weight average molecular weight (Mw) of 8,000 to more than 200,000 grams/mole, for example, of 20,000 to 80,000 grams/mole, and an intrinsic viscosity of 0.40 to 1.0 deciliters per gram (dl/g) as measured in methylene chloride at 25° C. The brominated polycarbonate can be branched or unbranched. The brominated polycarbonate can be derived from brominated dihydric phenols and carbonate precursors. Alternatively, the brominated polycarbonate can be derived from a carbonate precursor and a mixture of brominated and non-brominated aromatic dihydric phenols. Flame retardant brominated polycarbonates are disclosed, for example, in U.S. Pat. Nos. 4,923,933, 4,170,711 and 3,929,908. Exemplary brominated dihydric phenols include 2,2-bis(3,5-dibromo-4-hydroxyphenyl)propane and 2,2',6,6'-tetramethyl-3,3',5,5'-tetrabromo-4,4'-biphenol. Exemplary non-brominated dihydric phenols for mixing with brominated dihydric phenols to produce brominated polycarbonates include, for example, 2,2-bis(4-hydroxyphenyl)propane, bis(4-hydroxyphenyl) methane, 2,2-bis(4-hydroxy-3-methylphenyl)propane, 4,4-bis(4-hydroxyphenyl)heptane, and (3,3'-dichloro-4,4'-dihydroxydiphenyl)methane. Mixtures of two or more different brominated and non-brominated dihydric phenols can be used. Branched brominated polycarbonates can be used, as can blends of a linear brominated polycarbonate and a branched brominated polycarbonate.

In some embodiments, any polymer other than the polycarbonate, the flame retardant polycarbonate, and any polymeric phosphorus-containing flame retardant (e.g., the polyphosphonate) can be excluded from the process, and by extension, from the resulting polycarbonate particles.

Organic solvents suitable for use with the process disclosed herein can have the combination of the following features: the polycarbonate is soluble in the organic solvent, the solvent has a boiling point that is less than 100° C., and the organic solvent is substantially immiscible with water. "Substantially immiscible with water" as used herein means that the organic solvent is soluble to an extent of less than 10% by weight, or less than 5% by weight, or less than 1% by weight in water, or that water is soluble to the extent of less than 10%, or less than 5%, or less than 1% by weight in the organic solvent. In some embodiments, the organic solvent is immiscible with water. The organic solvent can include combinations comprising at least two organic solvents. The organic solvent can be methylene chloride, chloroform, dichloroethane, or a combination comprising at least one of the foregoing. In some embodiments, the organic solvent is methylene chloride.

In some embodiments, the first solution includes the polycarbonate or the flame retardant polycarbonate in an amount of 10 to 30 weight percent based on the total weight of the polycarbonate or the flame retardant polycarbonate and the organic solvent. Within this range, the first solution can include the polycarbonate or the flame retardant polycarbonate in an amount of 15 to 25 wt %, or 17 to 25 wt %, or 19 to 25 wt %, based on the total weight of the polycarbonate or the flame retardant polycarbonate and the organic solvent.

The first solution is combined with the second solution comprising an aqueous solvent and a surfactant, and optionally agitated to form the emulsion. The aqueous solvent can be water, preferably deionized water or Milli-Q™ water, or an aqueous buffered solution. The first solution and the second solution are combined under conditions effective to provide an emulsion. For example, the aqueous solvent can have a pH of 1 to 12, preferably 4 to 8. The water can be maintained at a temperature of 5 to 70° C., or 10 to 60° C., or 15 to 60° C., or 20 to 60° C., or 25 to 60° C. Combining the first and second solutions can include agitating the mixture, for example using a high shear mixer, at a speed of greater than 1,000 rotations per minute (rpm), for example, 2,500 to 25,000 rpm, or 3,000 to 20,000 rpm, or 4,000 to 10,000 rpm. Alternatively, agitation can be by shaking the sample, for example by hand shaking or using a shaker table resulting in a more mild agitation.

The surfactant can be anionic, cationic, or nonionic, or a combination thereof, preferably anionic. Suitable anionic surfactants can include a ($C_{8-36}$alkyl)benzene sulfonate, ($C_{8-36}$alkyl) sulfonate, mono- or di($C_{8-36}$alkyl) sulfosuccinate, ($C_{8-36}$alkyl ether) sulfate, ($C_{8-36}$)alkyl ether sulfonate, perfluoro($C_{2-12}$alkyl) sulfate, or perfluoro ($C_{2-12}$carboxylate). Exemplary anionic surfactants can include sodium dodecyl sulfate, sodium dodecyl benzene sulfonate, sodium lauryl sulfate, sodium laureth sulfate, sodium dioctyl sulfosuccinate, sodium dihexyl sulfosuccinate, perfluorooctane sulfonate, or perfluorooctanoic acid, or a combination comprising at least one of the foregoing.

Examples of cationic surfactants can include benzalkonium chloride, benzethonium chloride, 5-bromo-5-nitro-1, 3-dioxane, cetrimonium bromide (cetyl trimethylammonium bromide), cetyl trimethylammonium chloride, dimethyldioctadecylammonium chloride, lauryl methyl gluceth-10 hydroxypropyl dimonium chloride, and tetramethylammonium hydroxide.

Exemplary nonionic surfactants can include a $C_{8-22}$ aliphatic alcohol ethoxylate having about 1 to about 25 mol of ethylene oxide and having have a narrow homolog distribution of the ethylene oxide ("narrow range ethoxylates") or a broad homolog distribution of the ethylene oxide ("broad range ethoxylates"); and preferably $C_{10-20}$ aliphatic alcohol ethoxylates having about 2 to about 18 mol of ethylene oxide. Examples of commercially available nonionic surfactants of this type are Tergitol 15-S-9 (a condensation product of $C_{11-15}$ linear secondary alcohol with 9 moles ethylene oxide), Tergitol 24-L-NMW (a condensation product of $C_{12-14}$ linear primary alcohol with 6 moles of ethylene oxide) with a narrow molecular weight distribution from Dow Chemical Company. This class of product also includes the GENAPOL brands of Clariant GmbH.

Other nonionic surfactants that can be used include polyethylene, polypropylene, and polybutylene oxide condensates of $C_{6-12}$ alkyl phenols, for example compounds having 4 to 25 moles of ethylene oxide per mole of $C_{6-12}$ alkylphenol, preferably 5 to 18 moles of ethylene oxide per mole of $C_{6-12}$ alkylphenol. Commercially available surfactants of this type include Igepal CO-630, Triton X-45, X-114, X-100 and X102, Tergitol TMN-10, Tergitol TMN-100X, and Tergitol TMN-6 (all polyethoxylated 2,6,8-trimethyl-nonylphenols or mixtures thereof) from Dow Chemical Corporation, and the Arkopal-N products from Hoechst AG.

Still others include the addition products of ethylene oxide with a hydrophobic base formed by the condensation of propylene oxide with propylene glycol. The hydrophobic portion of these compounds preferably has a molecular weight between about 1500 and about 1800 Daltons. Commercially available examples of this class of product are the Pluronic brands from BASF and the Genapol PF trademarks of Hoechst AG.

The addition products of ethylene oxide with a reaction product of propylene oxide and ethylenediamine can be used. The hydrophobic moiety of these compounds consists of the reaction product of ethylenediamine and excess propylene oxide, and generally has a molecular weight of about 2500 to about 3000 Daltons. This hydrophobic moiety of ethylene oxide is added until the product contains from about 40 to about 80 wt % of polyoxyethylene and has a molecular weight of about 5,000 to about 11,000 Daltons. Commercially available examples of this compound class are the Tetronic brands from BASF and the Genapol PN trademarks of Hoechst AG.

In some embodiments, the nonionic surfactant is a $C_{6-12}$ alkyl phenol having 4 to 25 moles of ethylene oxide per mole of $C_{6-12}$ alkylphenol, preferably 5 to 18 moles of ethylene oxide per mole of $C_{6-12}$ alkylphenol.

In some embodiments, the surfactant comprises a biopolymer, for example, gelatin, carrageenan, pectin, soy protein, lecithin, casein, collagen, albumin, gum arabic, agar, protein, cellulose and derivatives thereof, a polysaccharide and derivatives thereof, starch and derivatives thereof, or the like, or a combination comprising at least one of the foregoing, preferably gelatin. Gelatin is a product obtained by the partial hydrolysis of collagen derived from the skin, white connective tissue, and bones of animals. It is a derived protein comprising various amino acids linked between adjacent amino and carbonyl groups to provide a peptide bond. The amino acid combinations in gelatin provide amphoteric properties, which are responsible for varying isoelectric values, depending somewhat upon the methods of processing. Important physical properties of gelatin such as solubility, swelling, and viscosity show minimum values at the isoelectric point. In some embodiments, the gelatin can be a recombinant gelatin or a plant-based gelatin.

The gelatin surfactant can comprise type A gelatin, type B gelatin, or a combination comprising at least one of the foregoing. Type A gelatin results from acid pretreatment (swelling of the raw material in the presence of acid) and is generally made from frozen pork skins treated in dilute acid (HCl, $H_2SO_3$, $H_3PO_4$, or $H_2SO_4$) at a pH of 1 to 2 for 10 to 30 hours, after which it is water washed to remove excess acid, followed by extraction and drying in the conventional manner. Type B gelatin results from alkali pretreatment (swelling of the raw material in the presence of an alkali) and is generally made from ossein or hide stock which is treated in saturated lime water for 3 to 12 weeks, after which the lime is washed out and neutralized with acid. The adjusted stock is then hot water extracted and dried as with type A. Dry bone is cleaned, crushed, and treated for 10 to 14 days with 4 to 7% HCl to remove the minerals (principally tricalcium phosphate) and other impurities before reaching the stage known as ossein. Dry bone is 13 to 17% gelatin whereas dry ossein is 63 to 70% gelatin. Type A gelatin is characterized by an isoelectric zone between pH 7 and 9, whereas type B gelatin has an isoelectric zone between pH 4.7 and 5.0. Thus the ionic character of the gelatin when used as a surfactant can be selected based on the pH of the second solution. Relative to each other, type A gelatin has less color, better clarity, more brittleness in film form and is faster drying than type B. In some embodiments, the gelatin is type B gelatin.

Combinations of any of the foregoing surfactants can be included in the second solution. When present, a surfactant can be included in the second solution in an amount of 0.1 to 10 weight percent, based on the total weight of the second solution.

The emulsion can include the surfactant in a surfactant to polycarbonate weight ratio of 0.008:1 to 0.04:1. The emulsion can include water in a water to organic solvent weight ratio of greater than or equal to 0.4:1 to 1.25:1, or 0.4:1 to 1:2, or 0.5:1 to 1:1.5, or 0.6:1 to 1:1, or 0.8:1 to 1:1, or 0.8 to 1.25:1.

At least a portion of the organic solvent is removed from the emulsion to provide an aqueous slurry comprising a plurality of particles comprising the polycarbonate and the phosphorus-containing flame retardant or the flame retardant polycarbonate.

Removing at least a portion of the organic solvent can include exposing the emulsion to heat by adding the emulsion into a receiving water. The receiving water can be deionized water, an aqueous buffered solution, or water having a pH of 1 to 12. The receiving water can optionally include a surfactant. The surfactant present in the receiving water can be the same or different as the surfactant of the second solution. For example, the surfactant present in the receiving water can be sodium dodecyl benzene sulfonate, sodium lauryl sulfate, or a combination comprising at least one of the foregoing, preferably sodium dodecyl benzene sulfonate. When present, the surfactant in the receiving water can be in an amount of 0.01 to 3 wt % based on the total weight of the receiving water. Within this range, the surfactant can be present in the receiving water in an amount of 0.01 to 1 wt %, or 0.1 to 0.5 wt % based on the total weight of the receiving water. The receiving water is maintained at a temperature of greater than or equal to 25° C., for example 25 to 100° C., or 25 to 90° C., or 40 to 80° C., or 40 to 70° C. to remove the organic solvent and form an aqueous dispersion including a plurality of polycarbonate polymer particles dispersed in water.

The emulsion can be transferred to the receiving water in a dropwise manner, or by spraying through a nozzle. The transfer of the emulsion to the receiving water can occur above the surface of the receiving water, at the surface of the receiving water, or below the surface of the receiving water. In some embodiments, the emulsion can be heated up to, below, or above the boiling point of the emulsion prior to transferring to the receiving water. After transferring the emulsion to the receiving water, the organic solvent can be removed (e.g., by distillation) to form an aqueous polymer dispersion.

Alternatively, exposing the emulsion to heat can include heating the emulsion directly to a temperature of 25 to 90° C., for example 40 to 80° C., or 40 to 70° C. to provide the slurry. The direct heating of the emulsion can be conducted until 70 to 90% of the organic solvent is removed. The method can then further comprise agitating the slurry without heating, further heating the resultant slurry at a reduced temperature of 26 to 45° C., or both, to remove the remaining organic solvent. Without wishing to be bound by theory, it is believed that this method of direct heating to provide the slurry can reduce or eliminate undesirable aggregation of the polycarbonate, which can lead to large particle size and low yield.

In some embodiments, removing at least a portion of the organic solvent can optionally be under reduced pressure, for example less than 1000 millibar (mbar), or less than 900 mbar, or less than or equal to 800 mbar. In some embodiments, reduced pressure of 800 to 1000 mbar can be used. In some embodiments, a variable reduced pressure can be used, for example decreasing from 1000 mbar to 800 mbar.

Removing at least a portion of the organic solvent can be conducted in the absence of heat, for example by purging the emulsion with air, nitrogen, argon, or a combination comprising at least one of the foregoing. Optionally, vacuum can be used in removing the organic solvent.

Removing at least a portion of the organic solvent can also include other methods that are generally known for removing organic solvents, for example, by thin film evaporation, wiped film evaporation, rotary evaporation, freeze drying, spray drying, ultrasonic evaporation, and the like. In some embodiments, removing at least a portion of the organic solvent can be by rotary evaporation, which can include exposing the emulsion to heat (i.e., include heating the emulsion directly to a temperature of 25 to 90° C.), preferably under reduced pressure (i.e., less than 1000 millibar).

The process can optionally further include recovering the polycarbonate particles. Recovering can be by filtering the slurry. Filtering can include one or more steps, each step independently using a filter having a desired pore size. For example, recovering the particles can include filtering the slurry through a filter having an average pore size of 150 μm or 75 μm to remove large particles (e.g., particles having a diameter greater than 150 μm or 75 μm, respectively). The filtrate, including particles having a diameter of less than 150 μm or 75 μm, respectively, can subsequently be filtered, for example using a filter having an average pore size of 1 μm to provide a wet cake comprising the thermoplastic polymer particles. In some embodiments, the wet cake can be washed one or more times with water, for example the wet cake can be washed with deionized water at a temperature of 25 to 100° C.

Recovered polycarbonate particles can be easily redispersible in water, optionally in the presence of a surfactant, for example an ionic or nonionic surfactant described above.

The polycarbonate particles can have a residual gelatin content of less than 1000 parts per million, preferably of less than 500 parts per millions, more preferably of less than 250 parts per million, even more preferably of less than 150 parts per million. Residual gelatin content can be determined, for example, using a colorimetric protein assay, as described in the working examples below.

The polycarbonate particles prepared according to the method described herein can have at least one of a Dv90 of 5 to 140 micrometers, or 10 to 80 micrometers, or 20 to 60 micrometers, or 5 to 60 micrometers, a Dv50 of 3 to 60 micrometers, or 5 to 40 micrometers, or 8 to 25 micrometers, or 3 to 25 micrometers, a Dv10 of 0.1 to 20 micrometers, or 2 to 15 micrometers, or 3 to 10 micrometers, or 0.1 to 10 micrometers, or a particle size distribution span of 1.05 to 3.5, or of 1.1 to 3.1, or of 1.15 to 2.5. Particle size and size distribution can be determined using known techniques, for example laser diffraction as described in the working examples below. The volume-based particle sizes "Dv90", "Dv50", and "Dv10" are defined as follows: "Dv50" corresponds to 50% of the particles (based on volume) below a certain diameter. Dv50 is considered the mean particle size for a volume distribution. "Dv90" and "Dv10" correspond to 90% and 10%, respectively, of the particles (based on volume) below a certain diameter. The particle size distribution, expressed as the "span" can be calculated according to the following equation:

$$\text{Span}=(Dv90-Dv10)/Dv50.$$

The polycarbonate particles can be recovered in a yield greater than 25%, preferably greater than 50%, more preferably greater than 75%, even more preferably greater than 90%.

Advantageously, the recovered polycarbonate particles can have a glass transition temperature of less than or equal to 140° C., or less than or equal to 130° C., or less than or equal to 120° C., or 100 to 110° C.

The polycarbonate particles can have a percent crystallinity of less than 10%, or less than 5%, or less than 2%, or less than 1%. The crystallinity of the particles can be determined, for example, using differential scanning calorimetry (DSC), as described in the working examples below.

Polycarbonate particles represent another aspect of the present disclosure. The polycarbonate particles can be prepared according to the above-described method. Polycarbonate particles independent of their method of preparation are also disclosed. The polycarbonate particles comprise a polycarbonate and a phosphorus-containing flame retardant or a flame retardant polycarbonate. The polycarbonate particles can have at least one of a Dv90 of 5 to 140 micrometers, or 10 to 80 micrometers, or 20 to 60 micrometers, a Dv50 of 3 to 60 micrometers, or 5 to 40 micrometers, or 8 to 25 micrometers, a Dv10 of 0.1 to 20 micrometers, or 2 to 15 micrometers, or 3 to 10 micrometers, and a particle size distribution span of 1.05 to 3.5, or of 1.1 to 3.1, or of 1.15 to 2.5. The polycarbonate particles can further have a glass transition temperature of less than or equal to 140° C., or less than or equal to 130° C., or less than or equal to 120° C., or 100 to 110° C. The polycarbonate particles can have a residual gelatin content of less than 1000 ppm, for example less than 500 ppm, or less than 250 ppm, or less than 150 ppm. The polycarbonate particles can have a percent crystallinity of less than 10%, or less than 5%, or less than 2%, or less than 1%. The particles can have a phosphorus content of, for example, 0.1 to 2 weight percent, or 0.2 to 1.5 weight percent, or 0.2 to 1.2 weight percent.

The polycarbonate particles can be used in many applications where particulate, high performance polymers are used, for example in thermoplastic and thermoset composites, unidirectional tapes, laminate applications, coating applications, sintering applications and additive manufacturing. Therefore, an article prepared from the polycarbonate particles represents another aspect of the present disclosure. Advantageously, the polycarbonate particles described herein can be used for the manufacture of articles including molded articles, extruded articles, powder bed fused articles, coatings, coated articles, films, and the like. The polycarbonate particles described herein can advantageously be more easily processed due to the lower Tg.

Thus, using the process described herein can provide flame retardant polycarbonate particles in good yield having particular size characteristics and a desirable glass transition temperature. Accordingly, an improved process for the preparation of flame retardant polycarbonate particles is provided Further information is provided by the following non-limiting examples.

EXAMPLES

Materials for the following examples are listed in Table 1.

Polymer Particle Characterization

The yield of the polymer particles produced in the following examples was based on the particles obtained after being passed through a 150 micrometer sieve or through a 75 micrometer sieve, followed by filtration though a microfiber filter paper having 0.7 micrometer opening under vacuum. The particles were washed well with deionized water (up to 300 ml), isolated, and dried in vacuum oven at 50° C.-105° C. overnight. Process yield was calculated based on the weight of the polymer particles recovered and the weight of the polymer and FR additive present in the initial emulsion (e.g., in Example 1, the total weight of dry polymer particles recovered was 22.5 grams, and the initial polymer weight was 25 grams, giving a yield of 22.5/25*100=90%).

The aqueous polymer particle slurry passed through the sieve was used for particle size measurement. The volume-based particle size distribution was measured using laser diffraction technology on a Mastersizer 3000 from Malvern with a Hydro MV dispersion unit. "Dv50" corresponds to 50% of the particles (based on volume) below a certain diameter. The "span" of the particle size distribution is defined as follows:

TABLE 1

| Abbreviation | Description | Source |
|---|---|---|
| BPA-PC-1 | Bisphenol A homopolycarbonate, Mw = 20,000 to 30,000 g/mol (determined via GPC using bisphenol A polycarbonate standards), manufactured by interfacial polymerization; obtained as Lexan ™ C017 | SABIC |
| BPA-PC-2 | Bisphenol A homopolycarbonate, manufactured by interfacial polymerization, having a melt volume-flow of 10 cm³ per 10 minutes, according to ISO 1133; obtained as Lexan ™ OQ1022 | SABIC |
| BPA-PC-3 | High flow bisphenol A homopolycarbonate, average Mw of about 22,000 g/mol (determined via GPC using bisphenol A polycarbonate standards), manufactured by interfacial polymerization, having a melt volume-flow rate of 26 cm³/10 minutes, according to ISO 1133; obtained as Lexan ™ HF1110 from SABIC | SABIC |
| PPPBP-PC | N-phenylphenolphthaleinylbisphenol, 2,2-bis(4-hydro))-bisphenol-A copolymer, 32 mol % PPPBP, Mw = 23,000 to 27,000 g/mol (determined via GPC using bisphenol A polycarbonate standards), manufactured by interfacial polymerization | SABIC |
| PPC | Poly(phosphonate-co-carbonate) with 3 wt. % phosphorus available under the designation FRX CO3000 | FRX Polymers |
| HPP | Homopolyphosphonate with 10.8 wt. % of phosphorus available under the designation Nofia HM1100 | FRX Polymers |
| FR-PC | Flame retardant polycarbonate composition including bisphenol A polycarbonate having a Mw of 15,000 to 20,000 g/mol, bisphenol A polycarbonate having a Mw of 18,000 to 25,000 g/mol, bisphenol A polycarbonate having a Mw of 25,000 to 35,000 g/mol, mold release agent, antioxidant, stabilizer, TSAN anti-drip agent, and 10 wt % resorcinol di(phenylphosphate), obtained as Thermocomp KIPCE16001 | SABIC |
| PhPhN | Phenoxyphosphazene (FR additive) available under the designation Rabitle EP-100 (FR additive) | |
| RDP | Resorcinol bis (diphenyl phosphate); CAS. Reg. No. 57583-54-7 (FR additive) | |
| BPA-DP | Bisphenol A bis(diphenyl phosphate) (FR additive) | |
| SDBS | Sodium dodecylbenzene sulfonate, technical grade (surfactant), CAS. Reg. No. 25155-30-0 | Acros Organics |
| Gelatin | Type B Gelatin | Fisher Scientific |
| MEK | Methyl ethyl ketone, CAS Reg. No. 78-93-3 | Acros Organics |
| DCM | Dichloromethane (methylene dichloride), CAS. Reg. No. 75-09-2 | |
| DIW | Deionized water | |
| Water | Milli-Q ™ qater | |
| T-10 | Nonylphenol ethoxylate (Tergitol NP-10) (surfactant) | Dow |

$$\text{span} = \frac{Dv90 - Dv10}{Dv50}$$

where Dv90 and Dv10 are volume size diameters at 90% and 10% cumulative volume, respectively. A smaller span value indicates narrower particle size distribution and vice versa.

Examples 1-11 and Comparative Example A

Emulsion Preparation. The polymer or combination of polymer and additive, selected from the materials listed in Table 1 were dissolved in dichloromethane (DCM). The amount (weight percent, based on total weight of the compositions) of the polymers and FR additives used in each of Examples 1-11 and Comparative Example A are listed in Table 2 and described further below.

To prepare the emulsions of Examples 1-11 and Comparative Example A, sodium dodecyl benzene sulfonate (SDBS) ionic surfactant was dissolved in deionized water to form an aqueous solution. The aqueous solution was added to the polymer and additives solution. Emulsions were prepared by mixing the two phases with a high degree of shear force using an IKA high shear mixer (IKA T25 ULTRA Turrax with S25N-25F tool) to produce a stable emulsion. The rotor and stator diameters were 18 mm and 25 mm, respectively. The gap between the rotor and the stator was 0.5 mm. The minimum and maximum rotations per minute (RPM) settings available for high shear mixer were 2,800 and 22,000 RPM, respectively.

Further details are given here for Example 1, which are applicable to Comparative Example A and Examples 1-11. In Example 1, BPA-PC-1 and RDP were provided at relative concentrations of 97.3 weight % and 2.7 weight %, respectively, the weight percent being based on the total weight of the dry polymer and phosphorus-containing flame retardant. The total weight of the polymer and phosphorus-containing flame retardant was 25 grams (i.e., 24.325 grams of BPA-PC-1 and 0.675 grams of RDP). Since RDP contains approximately 10.7% of phosphorus, the phosphorus loading was ((0.675*0.107)/25)*100=0.3% (indicated as "Wt. % P" in Table 2). Then, 100 grams of DCM was added to the BPA-PC-1 and RDP, resulting in a total of 125 grams of solution containing 20 weight % of BPA-PC-1/RDP. The SDBS solution in deionized water was prepared separately by combining 99.8 grams of water with 0.2 grams of SDBS, resulting in a 0.2 weight % SDBS solution (Examples 2-11 and Comparative Example A). In Example 5 the SDBS concentration was 0.1 weight %. Next, 100 grams of SDBS solution was added to 125 grams of the BPA-PC-1/RDP solution, corresponding to an aqueous solution to organic solution ratio of 0.8:1. This mixture was then emulsified using a homogenizer running at 8,000 RPM for 10 minutes.

Particle formation was achieved through precipitation with hot water. To prepare the receiving water for heating the emulsions to remove the organic solvent, 800 grams of the 0.2 weight % SDBS solution was placed in a separate tank equipped with an agitator, baffles, and a heating jacket. The water was heated to the precipitation temperature listed in Table 2 ("Pptn. temp.") for each of Comparative Example A and Examples 1-11. The tank was agitated at approximately 150 to 160 RPMs.

Each emulsion was added to the receiving water in a dropwise manner at a rate of about 7 grams per minute, while the temperature was maintained. Due to the DCM evaporation, precipitation of polymer particles occurred. To control the foam build-up on top of the hot water surface as well as to constantly sweep off the methylene chloride vapor from the headspace, one or more nitrogen sweeps was employed when needed. The resulting aqueous polymer slurry was filtered through a 150 μm sieve to remove coarse particles, and the DV10, DV50, DV90, and span were determined as described above. The aqueous polymer slurry which passed through the 150 μm sieve was further filtered through a 0.7 μm microfiber filter paper to remove the bulk of the water, and washed with additional water. The polymer particles were then dried in an oven overnight at a temperature of 50 to 60° C., and process yield was calculated based on the weight of the recovered particles versus the weight of the polymer and FR additive (if any) present in the initial emulsion.

TABLE 2

| Ex. No. | BPA-PC-1 | RDP | BDA-DP | P-PC | HPP | PhPhN | Wt .% P | Pptn. temp. (° C.) | % Yield | Dv10 (μm) | Dv50 (μm) | Dv90 (μm) | Span |
|---|---|---|---|---|---|---|---|---|---|---|---|---|---|
| A* | 100.0 | 0.0 | — | — | — | — | 0.0 | 65 | 93 | 7.5 | 15.5 | 27.8 | 1.31 |
| 1 | 97.3 | 2.7 | — | — | — | — | 0.3 | 63 | 90 | 6.11 | 15 | 30.7 | 1.64 |
| 2 | 94.8 | 5.2 | — | — | — | — | 0.6 | 63 | 88 | 7.18 | 13.9 | 23.6 | 1.18 |
| 3 | 90.1 | 9.9 | — | — | — | — | 1.1 | 75 | 24 | 3.23 | 9.8 | 26.4 | 2.36 |
| 4 | 90.1 | — | 9.9 | — | — | — | 0.9 | 63 | 70 | 4.63 | 16.7 | 53.2 | 2.91 |
| 5 | 94.8 | — | 5.2 | — | — | — | 0.5 | 63 | 75 | 6.59 | 15 | 27.7 | 1.41 |
| 6 | 97.3 | — | 2.7 | — | — | — | 0.2 | 63 | 91 | 7.18 | 14.7 | 25.7 | 1.25 |
| 7 | 67 | — | — | 33 | — | — | 1.0 | 63 | 98 | 6.29 | 13.2 | 23.3 | 1.29 |
| 8 | 67 | — | — | 33 | — | — | 1.0 | 63 | 94 | 6.08 | 12.6 | 21.8 | 1.25 |
| 9 | 90.7 | — | — | — | 9.23 | — | 0.3 | 63 | 90 | 5.02 | 12.1 | 23.1 | 1.49 |
| 10 | 92.5 | — | — | — | — | 7.5 | 1.0 | 63 | 71 | 8.84 | 21.6 | 58.3 | 2.29 |
| 11 | 72.5 | 2.5 | — | 25 | — | — | 1.0 | 63 | 66 | 5.96 | 16.5 | 56.3 | 3.05 |

*Comparative

As shown in Table 2, it was possible to make flame retardant polycarbonate particles at a range of phosphorus loadings (0.2 to 1.1 wt. %). The particles for Examples 1-11 had a DV50 of 9.8 to 21.6 micrometers and span of 1.18 to 3.05. The yields for Examples 1-11 varied from 24% to 98%. Comparative Example 1, BPA-PC-1 without any FR additive, had a DV50 of 15.5 micrometers and a yield of 93%.

As can be seen generally from Examples 1-6, which used either RDP or BPA-DP as the flame retardant, the phosphorus content varied from 0.2 to 1.1 weight %. Lower yields were generally observed as the phosphorus content increased. Examples 7 and 8, which included PPC (a polyphosphonate-co-carbonate) showed high yields for 1% phosphorus loading.

Figure 4:
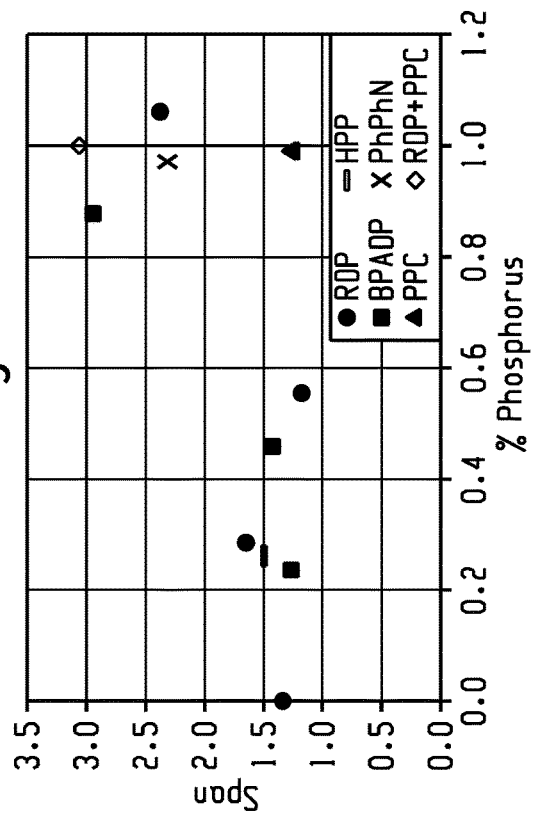
FIG. 4 shows the effect of phosphorus flame retardant loading on the span of the particle size distributions of the polymer particles of Examples 1-11.
Figure 1:
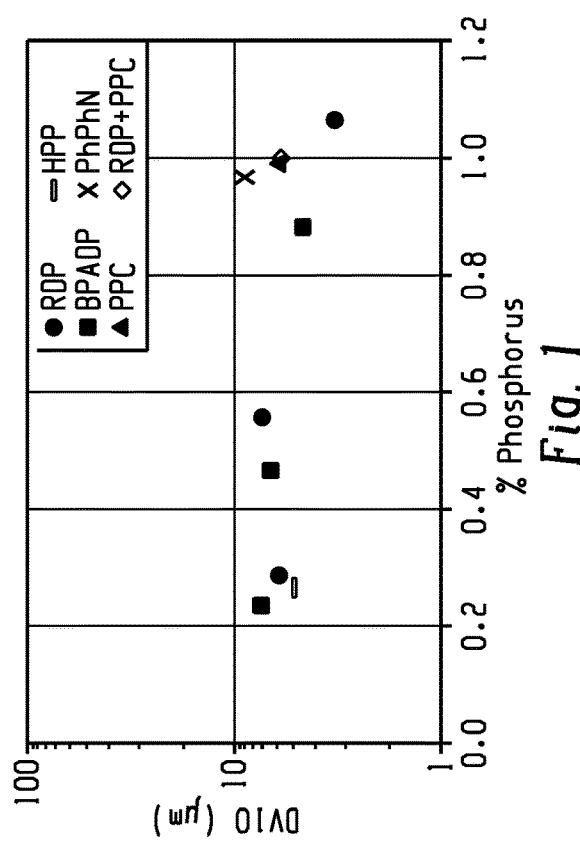
FIG. 1 shows the effect of phosphorus flame retardant loading on the Dv10 of the polymer particles of Examples 1-11.
Figure 3:
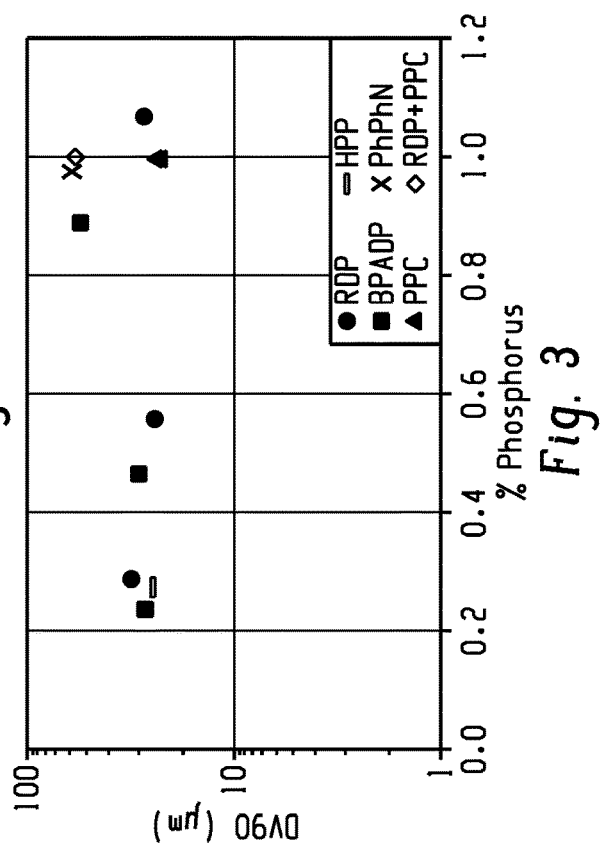
FIG. 3 shows the effect of phosphorus flame retardant loading on the Dv90 of the polymer particles of Examples 1-11.
Figure 5:
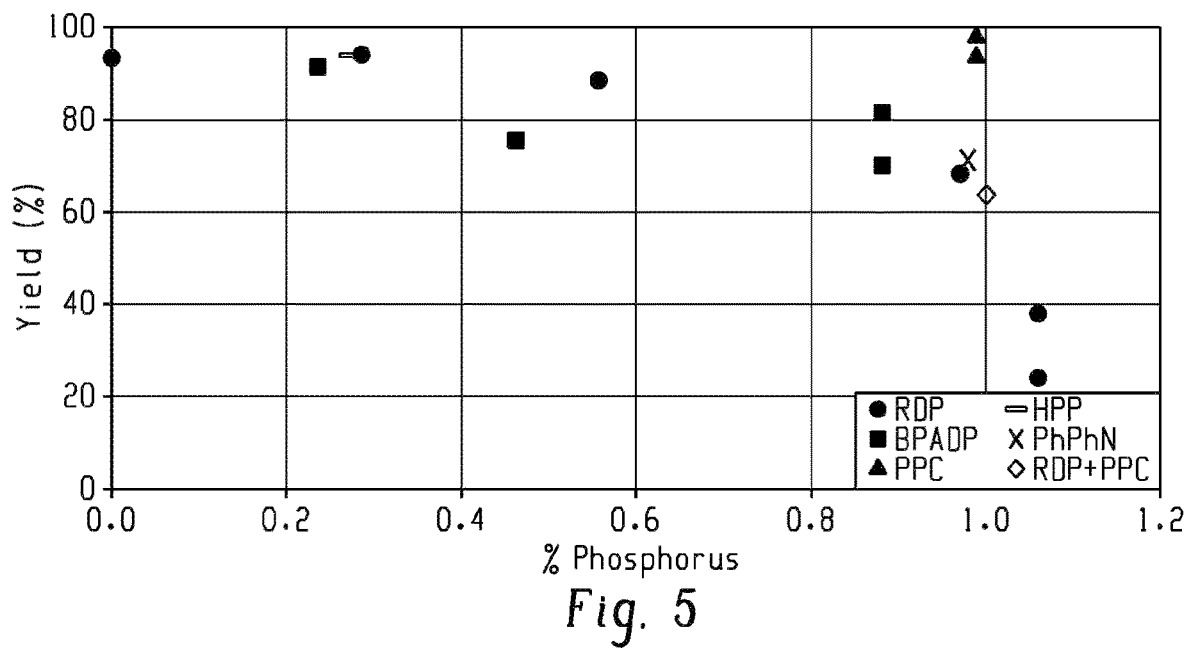
FIG. 5 shows the effect of phosphorus flame retardant loading on the yield of the polymer particles of Examples 1-11.

FIGS. 1 and 2 show the effect of phosphorus loading on the Dv10 and Dv50, respectively, of the polymer particles of Examples 1-11. From FIGS. 1 and 2, it can be seen that the Dv10 and Dv50 are similar for the different Examples. However, as shown in FIG. 3, the Dv90 increased for RDP- and BPADP-containing formulations. FIG. 4 shows the span data for these examples, where an increase in span with an increase in phosphorus content was generally observed, with the highest spans observed for RDP and BPADP formulations. The yield of the Examples is shown in FIG. 5. Thus, the data provided herein shows that different types of flame retardant additives can have a different effect on the surface properties that determine particle agglomeration, especially at relatively high phosphorus content.

Examples 12-14

Examples 12-14 demonstrate a method of making micronized particles using a direct volatilization method to remove the organic solvent, as opposed to the method using precipitation in hot water described above for examples 1-11.

Emulsion Preparation. In Examples 12-14, three polymer powders were produced from FR-PC, a flame-retardant polycarbonate composition, by dissolving 200 grams of FR-PC pellets in 1,133 grams of DCM, corresponding to a total of 1,333 grams of 15 weight % FR-PC solution. A SDBS solution in deionized water was prepared separately by combining 1,326.3 grams of water and 6.7 grams of SDBS to form a 0.5 weight % SDBS solution. Next, 1,333 grams of the SDBS solution was added to 1,333 grams of the FR-PC solution corresponding to an aqueous solution to organic solution weight ratio of 1:1. This mixture was placed in a 4-liter beaker and emulsified using a homogenizer running at the RPMs indicated for each example in Table 3 below for 15 minutes.

Particle formation was achieved using direct volatilization. The beaker with the emulsion was placed in a hot oil bath. Two temperature readouts were available: one in the hot oil (equipped with a controller) and one in the emulsion. The beaker was also equipped with an impeller set at 120 to 180 RPM. To control the foam build-up on top of the hot water surface as well as to constantly sweep off the methylene chloride vapor from the headspace, one or more nitrogen sweeps were used when needed.

It was discovered that during DCM removal, significant agglomeration of the precipitated FR-PC particles occurred towards the end of the process, resulting in the particle size distribution being mostly above 150 micrometers. Without wishing to be bound by theory, it is believed that agglomeration of the FR-PC material during precipitation could have been due to the lower Tg of the material or the presence of the flame-retardant component, which has the potential to change the surface properties of the system. The present inventors discovered that agglomeration could be reduced by leaving residual DCM in the slurry at the end of heating, then removing the remaining DCM in a subsequent step where only mixing (no further heating) was used for a set period of time (about 2 hours).

The slurry that was formed was then passed through a 150-micrometer sieve to remove coarse particles, and a sample was removed to determine particle size. Due to the tendency of the particles to agglomerate, polymer particle washing was performed by settling, followed by decanting the top layer, and adding water to the settled particles. Typically settling time was approximately 12 to 24 hours and two to three washes were needed to remove the SDBS.

Results for the FR-PC polymer particles are shown in Table 3, where each of the emulsions of Examples 12 to 14 was prepared at a different RPM.

TABLE 3

| Ex. No. | Homogenizer RPM in emulsification | Dv10 (μm) | Dv50 (μm) | Dv90 (μm) | Span | % Yield |
|---|---|---|---|---|---|---|
| 12 | 10,000 | 20.2 | 60.0 | 125.0 | 1.75 | <10% |
| 13 | 12,500 | 16.3 | 41.9 | 79.7 | 1.51 | <10% |
| 14 | 22,000 | 0.8 | 1.8 | 3.2 | 1.29 | >60% |

It can be seen from the data in Table 3 that that lower shear during preparation of the emulsions led to creation of droplets that ultimately give larger particles. In particular, a homogenization speed of 10,000 RPM resulted in particles having a Dv50 of 60 micrometers (example 12), a homogenization speed of 12,500 RPM resulted in particles having a Dv50 of about 42 micrometers (example 13), and a homogenization speed of 22,000 RPM resulted in particles having a Dv50 of about 2 micrometers (example 14). Lower homogenization speeds also led to lower spans. For example, example 12 using a homogenization speed of 10,000 RPM resulted in a span of 1.75, while example 14 using a homogenization speed of 22,000 RPM resulted in a span of 1.29. However, the larger droplets and particles were observed to be more prone to agglomeration, which is believed to have led to lower yields (<10%) for examples 12 and 13.

Using an emulsion formed as in Example 14, temperature data collected during the process of particle formation is shown in Table 4. It was determined that for the present process conditions (bath temperature, ratio of aqueous to organic, etc.), the final temperature for heating the emulsion should be 42±0.5° C. Determining the temperature of the emulsion (and not only the temperature of the heating bath) allows for insight into the extent of solvent evaporation during the direct volatilization process. Furthermore, tracking the final emulsion temperature can avoid unnecessary extra heating, which can lead to undesirable agglomeration.

TABLE 4

| Time (minutes) | Data Set 1 | | Data Set 2 | |
|---|---|---|---|---|
| | Oil temperature (° C.) | Emulsion temperature (° C.) | Oil temperature (° C.) | Emulsion temperature (° C.) |
| 15 | 58.5 | 33.7 | 59.0 | 34.6 |
| 30 | 58.6 | 35.0 | 58.4 | 35.4 |
| 45 | 58.5 | 36.2 | 58.9 | 36.0 |
| 60 | 58.3 | 37.6 | 59.0 | 36.8 |
| 75 | 58.8 | 38.5 | 58.8 | 37.6 |
| 90 | 58.7 | 39.4 | 59.0 | 37.9 |
| 105 | 58.6 | 39.8 | 59.1 | 38.5 |
| 120 | 58.7 | 41.5 | 58.9 | 39.3 |
| 135 | 58.8 | 42.2 | 59.1 | 40.8 |
| 150 | — | — | 59.1 | 41.5 |

Example 15

For some applications, the polymer particles are used in the form of a slurry (i.e., re-dispersed in a surfactant solution in water). To make such a slurry, T-10 surfactant was provided in a 0.5 weight % concentration in water. Then, approximately 2.5 liters of the T-10 solution in water was placed in a 4-liter beaker equipped with impeller. The water was heated to 55° C. The polymer particles were added to the water at the rate of approximately 2 grams/minute with the impeller mixing the slurry until a final concentration of approximately 3 to 5 weight % of polymer in the slurry was obtained.

Examples 16-32

The following examples were conducted to further understand the effect of the type of surfactant. The two surfactants tested were sodium dodecyl benzene sulfonate (SDBS) and type B gelatin, also referred to as "gelatin B".

Gelatin was also used as a surfactant to prepare the polycarbonate particles. Emulsions for these examples were generally prepared by first compounding the solid components (i.e., the polycarbonate and the flame retardant) using a twin screw extruder to obtain flame retardant polycarbonate pellets. The pellets were dissolved in methylene chloride using a shaker table to provide a polymer solution not having any visibly suspended particles. Deionized water and surfactant were added to the polymer solution, and emulsification was carried out with an IKA homogenizer operating at 4,000 to 20,000 RPM, resulting in a stable emulsion. An aqueous polymer slurry was prepared using the precipitation method, as described above. The emulsion was slowly transferred to a vessel containing the receiving water at greater than 60° C.

Specifically, 25 grams of flame retardant polycarbonate pellets prepared as described above including BPA-PC-1 and 10 weight percent RDP or BPA-PC-2 and 10 weight percent RDP were dissolved in methylene chloride to produce a polymer solution. To this, deionized water was added with the surfactant (SDBS or Gelatin). The samples were homogenized using IKA homogenizer (IKA T25 Ultra-Turrax with a 18G tool) between 2800 and 8000 RPM for 5 minutes or a shaken via shaker table at low speed for 10 minutes. The emulsified material was transferred dropwise to another container containing 200 grams of deionized water (receiving water) and surfactant, maintained at greater than 70° C. After the full transfer, the aqueous dispersion was held at greater than 70° C. for another ten minutes to remove most of the organic solvent. The aqueous dispersion thus obtained was passed through a 75 micrometer sieve. Particles having a diameter greater than 75 micrometers were washed well with deionized water multiple times, isolated, and dried in a vacuum oven at 80° C. for two days. Based on the total polymer content in the emulsion, the yield of polymer particles less than 75 micrometers was calculated and is given in Table 5. The aqueous polymer dispersion which passed through the 75 micrometer sieve was measured for particle size distribution and the mean particle size (Dn50 and Dv50) results are also given in Table 5.

As shown in Table 5, when the emulsion is homogenized with water containing only SDBS as the surfactant (examples 31 and 32), particles are obtained in poor yield. Surprisingly, it was noted that when gelatin was used in combination with SDBS during homogenization (examples 19-30) or when SDBS is replaced entirely by gelatin during homogenization (examples 16-18), some formulations were able to provide a yield of greater than 80%. Further, from Table 5, it can be seen that mean particle size (Dv50) between 5 and 50 micrometers with a process yield of greater than 80% (based on particles below 75 micrometers) is achievable, for example, as shown in example 17-21 and 26-28. Interestingly, certain formulations were able to provide a mean particle size Dv50 of greater than 20 micrometers, for example as shown by examples 17 and 26-28.

Homogenization using a shaker table at low speed can be represented by a slow agitation using a mixing blade. Using this method, expenses relating to installation of a homogenizer can be avoided, which can be desirable. As shown in Table 5, samples homogenized using a shaker table (examples 20 and 21) also provide average particle size of 5 to 50 micrometers with a process yield of greater than 80%.

Figure 6:
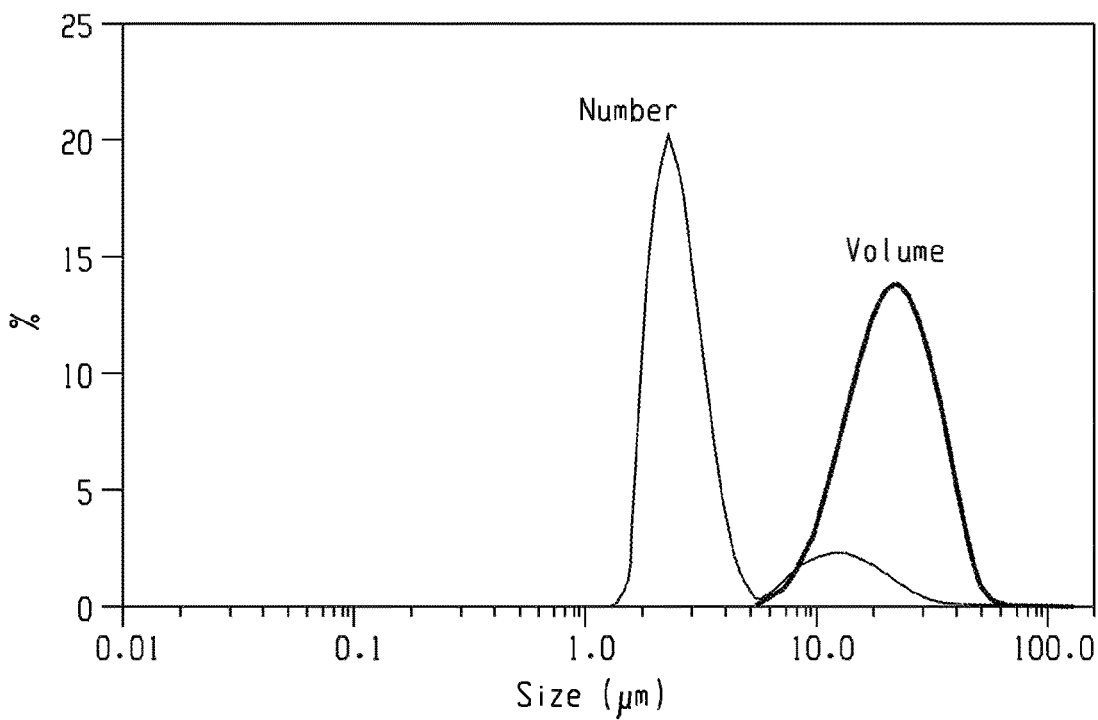
FIG. 6 shows particle size distribution curves (both volume and number based) for example 26.
Figure 7:
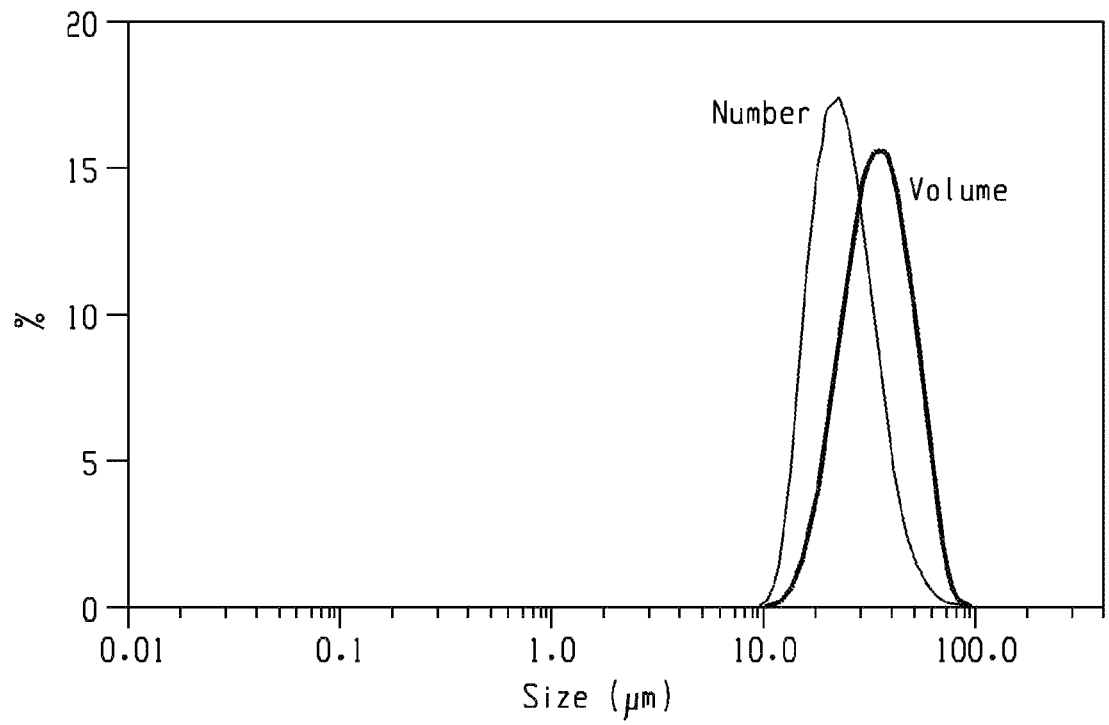
FIG. 7 shows particle size distribution curves (both volume and number based) for example 27.
Figure 8:
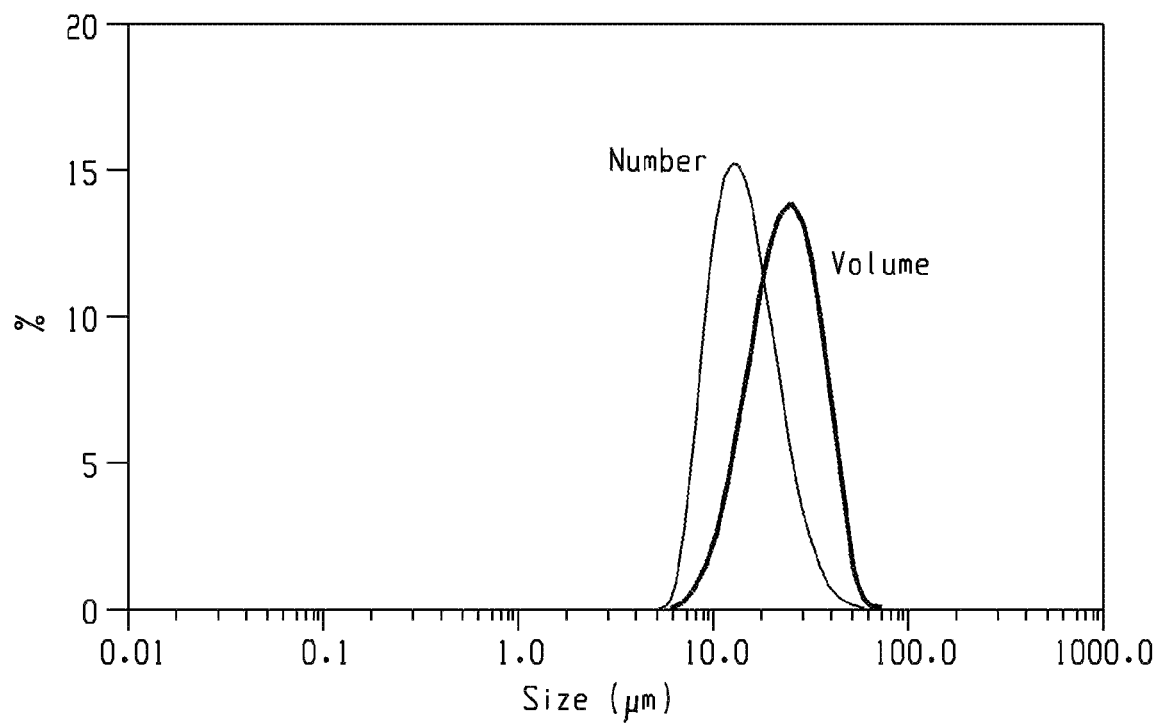
FIG. 8 shows particle size distribution curves (both volume and number based) for example 28.
Figure 9:
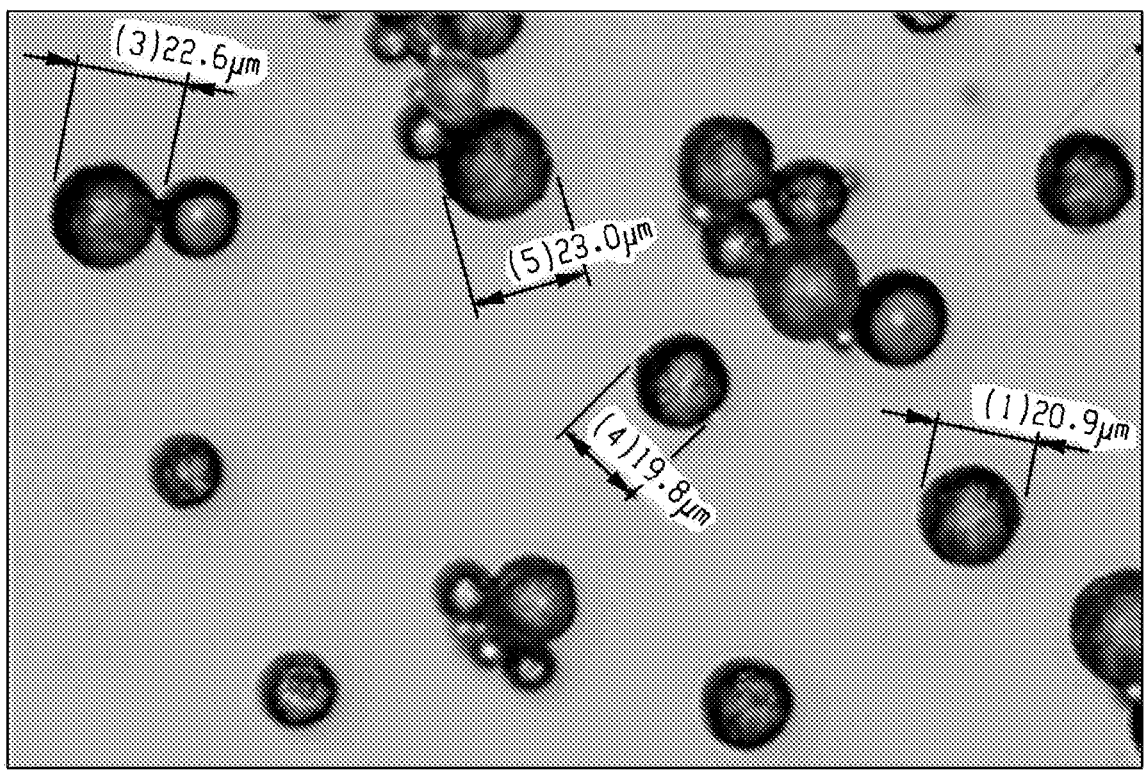
FIG. 9 shows an optical microscope image of example 28.

The particle size distribution curves (both volume and number based) for examples 26-28 are provided in FIGS. 6-8, respectively. It can be seen from examples 27 and 28 that both number- and volume-based particle size distributions are closer, indicating more uniform particle sizes. FIG. 9 shows an optical microscope image of example 28, which shows the spherical nature of these particles.

TABLE 5

| Ex. | BPA-PC-1 + 10% RDP (grams) | BPA-PC-2 + 10% RDP (grams) | DCM (grams) | Solids (%) | DIW (grams) | Surfactant in Emulsion | | Homogenization | | | | Surfactant in Receiving Water | | Yield (%) | Dn50 (μm) | Dv50 (μm) |
|---|---|---|---|---|---|---|---|---|---|---|---|---|---|---|---|---|
| | | | | | | Gelatin (grams) | SDBS (grams) | Equipment | Homogenization temperature (° C.) | RPM | Time (mins) | Gelatin (grams) | SDBS (grams) | | | |
| 16 | 25 | | 100 | 20% | 100 | 1 | | IKA | 23 | 2800 | 5 | | 0.4 | <50 | | |
| 17 | 25 | | 100 | 20% | 100 | 1 | | IKA | 23 | 5000 | 5 | | 0.4 | 81 | 3.9 | 27.6 |
| 18 | | 25 | 100 | 20% | 100 | 1 | | IKA | 23 | 8000 | 5 | 0.5 | 0.4 | 97 | 7.95 | 11.9 |
| 19 | 25 | | 100 | 20% | 20 | 0.5 | 0.2 | IKA | 23 | 4000 | 5 | 0.5 | 0.2 | 96 | 3.5 | 6 |
| 20 | 25 | | 70 | 26% | 7 | 0.225 | 0.045 | Shaker table | 23 | Low Speed | 10 | | 0.4 | 95 | 8.81 | 11.5 |
| 21 | 25 | | 74 | 25% | 7.8 | 0.2 | 0.04 | Shaker table | 5 | Low Speed | 10 | | 0.4 | 91 | 8.33 | 11.4 |
| 22 | 25 | | 100 | 20% | 100 | 0.25 | 0.05 | IKA | 5 | 2800 | 5 | | 0.4 | <50 | | |
| 23 | 25 | | 100 | 20% | 100 | 0.25 | 0.05 | IKA | 5 | 5000 | 5 | | 0.4 | <50 | | |
| 24 | 25 | | 100 | 20% | 100 | 0.25 | 0.05 | IKA | 5 | 8000 | 5 | | 0.4 | <50 | | |
| 25 | 25 | | 100 | 20% | 100 | 0.25 | 0.05 | IKA | 35 | 8000 | 5 | | 0.4 | 75 | 2.11 | 15.5 |
| 26 | 25 | | 100 | 20% | 100 | 1 | | IKA | 23 | 5000 | 5 | | 0.4 | 100 | 2.58 | 21.2 |
| 27 | 25 | | 100 | 20% | 100 | 1 | | IKA | 23 | 4000 | 5 | | 0.4 | 91 | 23.1 | 34.5 |
| 28 | 25 | | 100 | 20% | 100 | 1 | | IKA | 23 | 4400 | 5 | | 0.4 | 99 | 14.1 | 24 |
| 29 | 25 | | 100 | 20% | 100 | 0.25 | 0.1 | IKA | 23 | 4400 | 5 | | 0.4 | <50 | | |
| 30 | 25 | | 100 | 20% | 100 | 0.25 | 0.1 | IKA | 23 | 4400 | 5 | 0.25 | 0.1 | <50 | | |
| 31 | 25 | | 100 | 20% | 100 | | 0.4 | IKA | 23 | 4000 | 5 | | 0.4 | <50 | | |
| 32 | 25 | | 100 | 20% | 100 | | 0.4 | IKA | 23 | 8000 | 5 | | 0.4 | <50 | | |

Examples 33-54

The effect of the surfactant was also investigated when polymer particles were prepared by incorporating the individual components, as opposed to precompounding the polymer and the flame retardant as in the example above.

For these examples, 22.5 grams of BPA-PC-1 and 2.5 grams of RDP were dissolved in methylene chloride to produce a polymer solution. To this, deionized water was added with surfactant (SDBS or gelatin). The samples were homogenized using an IKA homogenizer (IKA T25 Ultra-Turrax with a 18G tool) operating at 5000 to 8000 RPM for 5 minutes or a shaken via shaker table at low speed for 10 minutes. The emulsified material was transferred dropwise to another container having 200 grams of deionized water ("receiving water") and surfactant, and was maintained at a temperature of greater than 70° C. After the full transfer, the aqueous dispersion was held at temperature for another ten minutes to remove substantially all of the organic solvent. The aqueous dispersion thus obtained was passed through a 75 micrometer sieve. The particles having an average size of greater than 75 micrometers were washed well with deionized water multiple times, isolated, and dried in a vacuum oven at 80° C. for two days. Based on the total polymer content in the emulsion, the yield of polymer particles having an average size of less than 75 micrometers was calculated and is shown in Table 6 for each formulation. The aqueous polymer dispersion which passed through the 75 micrometer sieve was measured for particle size distribution in Malvern 3000 and the mean particle size (Dn50 and Dv50) results are also given in Table 6.

From Table 6, it can be seen that the average particle size by volume (Dv50) between 5 and 50 micrometers can be made having a process yield of greater than 80% using a homogenizer with Gelatin as a surfactant (see, e.g., example 35), or using a combination of Gelatin and SDBS as the surfactant (see, e.g., example 47), and using a shaker table with a combination of Gelatin and SDBS (see, e.g., example 49), or using SDBS as the surfactant (see, e.g., examples 38 and 53).

TABLE 6

| Ex | BPA-PC-1 (grams) | RDP (grams) | DCM (grams) | Solids (%) | DIW | Surfactant in Emulsion Gelatin (g) | Surfactant in Emulsion SDBS (g) | Homogenization Equipment | Homogenization RPM | Time (mins) | Surfactant in Receiving Water Gelatin (g) | Surfactant in Receiving Water SDBS (g) | Yield (%) | Dn50 (μm) | Dv50 (μm) |
|---|---|---|---|---|---|---|---|---|---|---|---|---|---|---|---|
| 33 | 22.5 | 2.5 | 90 | 20% | 90 | | 0.09 | IKA | 8000 | 5 | | 0.4 | <50 | | |
| 34 | 22.5 | 2.5 | 90 | 20% | 90 | | 0.09 | IKA | 8000 | 5 | 1 | | 83 | | |
| 35 | 22.5 | 2.5 | 90 | 20% | 90 | 0.45 | | IKA | 8000 | 5 | | 0.4 | 97 | 2.3 | 11.5 |
| 36 | 22.5 | 2.5 | 90 | 20% | 90 | 0.45 | | IKA | 8000 | 5 | 1 | | 66 | | |
| 37 | 22.5 | 2.5 | 90 | 20% | 9 | | 0.09 | Shaker table | Low Speed | 10 | | 0.4 | <50 | | |
| 38 | 22.5 | 2.5 | 90 | 20% | 9 | | 0.09 | Shaker table | Low Speed | 10 | 1 | | 95 | 6.57 | 12.3 |
| 39 | 22.5 | 2.5 | 90 | 20% | 9 | 0.45 | | Shaker table | Low Speed | 10 | | 0.4 | <50 | | |
| 40 | 22.5 | 2.5 | 90 | 20% | 9 | 0.45 | | Shaker table | Low Speed | 10 | 1 | | <50 | | |
| 41 | 22.5 | 2.5 | 90 | 20% | 9 | 0.45 | | IKA | 8000 | 5 | | 0.4 | <50 | | |
| 42 | 22.5 | 2.5 | 90 | 20% | 9 | 0.45 | | IKA | 8000 | 5 | 1 | | <50 | | |
| 43 | 22.5 | 2.5 | 90 | 20% | 18 | 0.45 | | IKA | 8000 | 5 | | 0.4 | <50 | | |
| 44 | 22.5 | 2.5 | 90 | 20% | 18 | 0.45 | | IKA | 8000 | 5 | 1 | | <50 | | |
| 45 | 22.5 | 2.5 | 90 | 20% | 90 | 0.45 | | Shaker table | Low Speed | 10 | | 0.4 | <50 | | |
| 46 | 22.5 | 2.5 | 90 | 20% | 90 | 0.45 | | Shaker table | Low Speed | 10 | 1 | | <50 | | |
| 47 | 22.5 | 2.5 | 90 | 20% | 90 | 0.225 | 0.045 | IKA | 8000 | 5 min | 0.5 | 0.2 | 98 | 0.37 | 14.9 |
| 48 | 22.5 | 2.5 | 90 | 20% | 90 | 0.225 | 0.045 | IKA | 8000 | 5 min | | 0.4 | <50 | | |
| 49 | 22.5 | 2.5 | 90 | 20% | 9 | 0.225 | 0.045 | Shaker table | Low Speed | 10 min | 0.5 | 0.2 | 91 | 5.7 | 8.95 |
| 50 | 22.5 | 2.5 | 90 | 20% | 9 | 0.225 | 0.045 | Shaker table | Low Speed | 10 min | | 0.4 | 97 | 6.11 | 8.93 |
| 51 | 22.5 | 2.5 | 90 | 20% | 9 | | 0.09 | Shaker table | Low Speed | 10 min | 0.5 | 0.2 | 65 | | |
| 52 | 22.5 | 2.5 | 90 | 20% | 9 | | 0.09 | Shaker table | Low Speed | 10 min | 0.25 | | 75 | | |
| 53 | 22.5 | 2.5 | 90 | 20% | 9 | | 0.09 | Shaker table | Low Speed | 10 min | 0.5 | | 98 | 0.4 | 11.4 |
| 54 | 22.5 | 2.5 | 100 | | 100 | 1 | | IKA | 5000 | 5 min | | 0.4 | <60 | 2.23 | 14.4 |

Determination of Phosphorus Content

The phosphorus content of the starting material and the final dried spherical particles was evaluated using inductively coupled plasma-atomic emission spectroscopy (ICP-AES). Samples were prepared for ICP-AES according to the following procedure. Approximately 0.3 to 0.4 grams of sample was weighed into a microwave vessel and to this, 3 milliliters of concentrated sulfuric acid was added. The actual weight was recorded to the nearest 0.1 milligram. This mixture was kept on a hot plate for 15 to 20 minutes. To this mixture, 8 milliliters of nitric acid (about 76%) was added. The sample was then digested in a closed vessel microwave digestion process until the sample was completely digested. Upon completion, the mixture was made up to 50 milliliters by adding deionized water such that the final concentration of the acids matched the matrix of calibration standards. The final solution contained approximately 16% nitric acid and 6% sulfuric acid. Microwave assisted acid digestion was carried out for all polymer samples and phosphorus determination was performed by ICP-AES. Based on the detected phosphorus content, the concentration of the phosphorus-containing flame retardant (e.g., RDP) in the final powder was calculated.

The flame retardant polycarbonate pellets that were prepared by compounding BPA-PC-1 with 10% RDP exhibited 13,000 ppm of phosphorus, as determined by ICP-AES. Micronized powders prepared from these pellets (e.g., example 26) exhibited 12,900 ppm of phosphorus. This indicates that a significant portion of the flame retardant additive is retained in the powder.

The flame retardant polycarbonate pellets prepared by compounding BPA-PC-1 with 10% RDP also exhibited a glass transition temperature (Tg) of 105° C. using Differential Scanning calorimetry (DSC). The corresponding micronized powders (e.g., example 26) exhibited a Tg of 103° C.

Redispersability of the dried micronized flame retardant polycarbonate powders was also evaluated according to the following procedure. The filtered and washed powder sample of example 26 (before drying in an oven) was analyzed for particle size distribution characteristics as already described above in Table 6. The example 26 powder was then dried in an oven at 80° C. for two days under vacuum to obtain the dry powder. The dry powder was then redispersed in water using 0.2% of Tergitol TMN-10 surfactant and the particle size distribution was again analyzed. A comparison of the pre- and post-drying particle size distributions is provided in Table 7, which shows that the drying process did not significantly change the particle size distribution of the powder.

TABLE 7

| Example 26 | Wet Cake Before Drying | Redispersed Dried Powder |
|---|---|---|
| Dv10 | 14.3 μm | 13.5 μm |
| Dv50 | 24.5 μm | 24.0 μm |
| Dv90 | 39.7 μm | 39.7 μm |
| Dv100 | 58.8 μm | 58.8 μm |
| Span | 1.086 μm | 1.038 μm |

Quantification of Residual Gelatin

Residual gelatin amounts were quantified according to the following method. Trace amounts of gelatin can be detected spectrophotometrically using a UV/Vis spectrometer and a Protein Assay color reagent, obtained as Pierce 660 nm Protein Assay color reagent from Thermo Scientific. The protein assay reagent is based on the binding of a dye-metal complex in an acidic buffer to proteins that causes a shift in the dye's absorption maximum at 660 nanometers. A calibration curve was generated using this color reagent for gelatin concentrations ranging from 25 to 200 parts per million of gelatin. Since the presence of SDBS was found to interfere with the gelatin determination, two different sample preparation methods were used based on the process used to make the powder.

In cases where SDBS is not used, samples were prepared by weighing 2 grams of the sample into a 50 milliliter vial. Higher amount of sample increased the sensitivity of measurement. To this, 20 milliliters of methylene chloride was added. The mixture was shaken in a wrist shaker until the resin completely dissolved. To this solution, 10 milliliters of deionized water was added and the vial was shaken again for 15 minutes. The gelatin in the sample (which has a preference for water) is extracted into the aqueous layer. After phase separation, 1 milliliter of the aqueous extract was taken into a 20 milliliter vial, and 2 milliliters of the color reagent was added and mixed well. After stirring for 5 minutes, absorbance was measured at 660 nanometers, and the calibration curve was used to determine gelatin concentration in the sample. A second extraction was performed to confirm that all the gelatin had been extracted out of the sample with the first extraction.

In cases where SDBS is used, samples were prepared by weighing 2 grams of the sample into a 50 milliliter vial. To this, 20 milliliters of methylene chloride was added. The mixture was shaken in a wrist shaker until the resin completely dissolved. To this solution, 15 milliliters of methanol was added drop wise with stirring. Addition of methanol precipitates gelatin along with polycarbonate. The solution vial is centrifuged to separate the precipitate from the methanol and methylene chloride mixture. The precipitate (which is free from the residual SDBS), was redissolved in 20 milliliters of methylene chloride. The mixture was shaken in a wrist shaker until the precipitate completely dissolved. To this solution, 10 milliliters deionized water was added and the vial was shaken again for 15 minutes. The gelatin in the sample (which has a preference for water) was extracted into the aqueous layer. After phase separation, 1 milliliter of the aqueous extract was taken into a 20 milliliter vial, and 2 milliliters of the color reagent was added and mixed well. After stirring for 5 minutes, absorbance was measured at 660 nanometers, and the calibration curve was used to determine gelatin concentration in the sample.

The colorimetric technique was used to analyze four flame retardant polycarbonate powder samples prepared using different processing conditions. The color of the solution did not turn green upon addition of the color reagent, thus the sample did not contain any gelatin in an amount greater than 700 ppm. The results of this analysis are summarized in Table 8.

TABLE 8

| Sample | First Extraction, Gelatin (ppm) | Second Extraction, Gelatin (ppm) | Total Gelatin (ppm) |
|---|---|---|---|
| Methylene Chloride | ND | ND | 0 |
| RDP Extract | ND | ND | 0 |
| Example 20 | 45 | 4 | 49 |
| Example 21 | 70 | 0 | 70 |
| Example 27 | 165 | 1.5 | 166.5 |
| Example 28 | 670 | 12.5 | 682.5 |

Thus, from Table 8 it can be seen that spherical flame retardant polycarbonate powders with mean particle sizes of 5 to 50 micrometers exhibit residual Gelatin levels of less than 75 ppm. Examples 27 and 28 each exhibited Gelatin levels of less than 700 ppm.

The following examples demonstrate the improvement in flame retardant retention using the process described herein relative to prior processes.

Comparative Examples B-E are illustrative of flame retardant polycarbonate particles and aqueous dispersions prepared therefrom prepared according to the following process. A mixture containing 10 wt % RDP was prepared by combining 33.75 grams of polycarbonate BPA-PC-3 and 3.75 grams of RDP in a 500 milliliter glass bottle. The mixture was dissolved in 212.5 grams DCM on a shaker overnight at room temperature to end up with a 15 wt % RDP-PC solution. Subsequently, 250 grams MEK was rapidly added to the solution in one portion while mixing with an IKA T25 Ultra Turrax homogenizer at 20,000 rpm for 10 minutes. The precipitated RDP-containing PC powder was isolated by vacuum filtration using Whatman paper filter (ashless) with 8 μm pore size. The residue was washed with MEK and dried in the vacuum oven at a pressure of 50 mbar overnight at 100° C. Subsequently, the powder was mechanically ground (18,000 rpm) with a Retsch Ultra Centrifugal Mill ZM200 to reverse agglomeration/fusion from the filtering and drying step. An aqueous dispersion was prepared by adding the fine RDP-containing PC powder to a 250 milliliter glass bottle containing a mixture of Milli-Q water and SDBS while mixing with an IKA T25 Ultra Turrax homogenizer at 8,000 rpm for 5 minutes. The resulting white dispersion consisted of 5 wt % micronized RDP-containing PC, 0.25 wt % SDBS and 94.75 wt % Milli-Q water.

Examples 55 and 56 are representative dispersions prepared according to the process of the present disclosure. The same procedure as described above for Comparative Examples B-E was used, except that 250 grams of water with SDBS was added to the DCM solution of BPA-PC-3 and RDP instead of MEK. Otherwise, the same conditions were used. The water/SDBS mixture used for these examples included 0.625 grams SDBS and 249.375 grams of Milli-Q water (i.e., a SDBS concentration of 0.25 wt %). The resulting emulsion was transferred to a round bottom flask, and rotary evaporation was used to remove the DCM at a temperature of 40° C. The pressure was reduced in a stepwise fashion to 800 mbar, and was held at this pressure for an additional 60 minutes to remove the DCM and form the aqueous dispersion. To characterize the resulting particles, a small quantity of the dispersion was filtered by vacuum filtration using Whatman filter paper (ashless) with an 8 μm pore size. Measurements were performed on the powder after washing with water and drying at 50 mbar and 100° C. overnight.

Particle size distribution for Comparative Examples B-E and Examples 55 and 56 was determined as described above using laser diffraction technology (Mastersizer 20000 from Malvern). Differential scanning calorimetry (DSC) of the FR PC particles was also done using a TA Instruments Q2000 instrument, with a heating/cooling/heating scan (20° C.-300° C./300° C.-20° C./20° C.-300° C., 20° C./min) under Na atmosphere. The melting temperature (Tm) and the percent crystallinity were determined on the first heating curve. The percent crystallinity was calculated based on a heat of melting of 109.8 J/g for a 100% crystalline material. The glass transition temperature (Tg) was determined from the second heating curve. Inductively coupled plasma mass spectrometry (ICP-MS) was used to determined percent phosphorus and percent RDP in the particles. Approximately 200 mg of the dried FR-PC powder was digested in 6 ml of concentrated nitric acid (trace metal grade) by microwave assisted acid digestion using an Anton Paar Multiwave 3000 equipped with closed high pressure Quartz digestion vessels. After the microwave digestion run, the acid was analytically transferred into a pre-cleaned plastic centrifuge tube containing 1 ml of internal standard solution and was diluted with Milli-Q water up to the 50 ml mark. Each sample is diluted another 20, 50 or 100 times in order to maintain the measured concentration of Phosphorous within the calibration range. The phosphorous concentration (% P) in the diluted sample solutions was quantified using a multi-element calibration standard set from Inorganic Ventures using an Agilent 7500cx ICP-MS system and converted to RDP concentration (% RDP) based on a 10.9 wt % phosphorous content of RDP. The results of Comparative Examples B-E and Examples 55-56 are provided in Table 9 below.

TABLE 9

| Example | PSD of suspension or emulsion | | | PSD of aqueous dispersion | | | Tm (° C.) | Tg (° C.) | % Crystallinity | % P (wt %) | % RDP (wt %) |
|---|---|---|---|---|---|---|---|---|---|---|---|
| | Dv10 (μm) | Dv50 (μm) | Dv100 (μm) | Dv10 (μm) | Dv50 (μm) | Dv100 (μm) | | | | | |
| B | 2.6 | 5.8 | 11.1 | NT[b] | NT[b] | NT[b] | 228.0 | 127.6 | 41.9 | 0.42 | 3.82 |
| C | 2.4 | 5.4 | 13.1 | 27.7 | 70.5 | 139.7 | 229.9 | 132.1 | 23.0 | 0.33 | 3.00 |
| D | 2.4 | 4.8 | 9.4 | 25.5 | 67.9 | 134.3 | 228.7 | 125.6 | 25.1 | 0.47 | 4.27 |
| E | 2.5 | 5.1 | 9.9 | 29.3 | 79.2 | 158.8 | 228.6 | 125.9 | 26.0 | 0.40 | 3.68 |
| 55 | 2.4 | 11.0 | 46.0 | 0.8 | 3.3 | 6.7 | 225.6 | 105.0 | 0.9 | 0.99 | 9.04 |
| 56 | 0.8 | 4.4 | 8.7 | 0.7 | 3.2 | 6.3 | 241.1 | 103.7 | 1.2 | 0.99 | 9.10 |

[b]NT = not tested

As can be seen from Table 9, the reproducibility of the particle size distribution for both the MEK/DCM suspension and their aqueous SDBS dispersion is good (examples B-E). However, the data in Table 9 also show that the particle size increases going from the MEK/DCM suspension (average Dv50=5.3 μm) to the aqueous dispersion (average Dv50=72.5 μm), which is believed to be caused by agglomeration/fusion of the powder particles during filtration and subsequent drying. Although the dried powder was ground before preparing the aqueous dispersion, it could not prevent an increase of the average particle size compared to the initial precipitated powder in the DCM/MEK suspension.

Besides being a FR additive, RDP also has a strong value proposition due to its ability to reduce Tg of PC resin. In certain applications, such as those in the consumer electronics, it is highly desirable to have a PC resin with suppressed Tg to enable low temperature processing and fast throughput rates for manufacturing operations. As shown in Table 9, from DSC and ICP-MS it can be concluded that the precipitated RDP-containing PC powder of Comparative Examples B-E contains an average of 3.7 wt % RDP, resulting in an average Tg of 127.8° C. The low Tg nicely meets the expectation, since RDP is known to reduce the Tg of PC (147° C.) with ~4° C./wt %. However, the amount of incorporated RDP is low compared to the 10 wt % RDP in the FR-PC starting mixture. Thus, the majority of the RDP (~60%) is lost during the process, primarily through the filtering due to its solubility in the MEK/DCM solution. Thus, the comparative process is an inefficient multi-step process for making aqueous dispersions of micronized flame retardant PC particles in which the majority of RDP (~60%) is lost through the solvent-anti-solvent (DCM/MEK) filtrate and the particle size is increased throughout the process.

In contrast, the process of the present disclosure is a more efficient process for preparing aqueous dispersions of micronized flame retardant PC particles. The inventive process results in a much higher amount of RDP to be retained in the FR-PC powder, and avoids an undesirable increase in particle size, as can be seen from Examples 55 and 56 in Table 9. Specifically, from Table 9 it can be seen that after forming the emulsion, similar particle size is obtained as in the Comparative DCM/MEK suspensions. Where the Comparative process utilizes multiple steps to prepare an aqueous dispersion from the precipitated powder, the process of the present disclosure only includes removal of the DCM by evaporation (e.g., using a rotavapor) with an opposite effect on the particle size. Since the DCM is trapped in the emulsion particles from the present process, the particles tend to shrink to even lower particle sizes upon DCM evaporation instead of the observed increase of the particle size due to agglomeration/fusion during the process of the Comparative Examples. An additional benefit of this method is the improved RDP retention. With an average 9.1 wt % RDP and correlated low Tg of around 104° C., the retention of RDP in the FR-PC powder is about 90%. Also in contrast with the Comparative process, the process of the present disclosure results in almost completely amorphous FR-PC particles, with only ~1% crystallinity.

This disclosure further encompasses the following aspects.

Aspect 1: A process for the manufacture of polycarbonate particles, the process comprising: combining a first solution comprising (i) a polycarbonate and a phosphorus-containing flame retardant or a flame retardant polycarbonate, and (ii) an organic solvent with a second solution comprising (i) a surfactant and (ii) an aqueous solvent substantially immiscible with the organic solvent, under conditions of shear and temperature effective to provide an emulsion; and removing at least a portion of the organic solvent to provide an aqueous slurry comprising a plurality of particles comprising the polycarbonate and the phosphorus-containing flame retardant or the flame retardant polycarbonate.

Aspect 2: The process of aspect 1, wherein the polycarbonate is a homopolycarbonate, a copolycarbonate, a polycarbonate copolymer, or a combination comprising at least one of the foregoing, preferably wherein the polycarbonate is a bisphenol A homopolycarbonate, poly(carbonate-siloxane), poly(aromatic ester-carbonate), poly(aliphatic ester-carbonate), poly(aromatic ester-carbonate-siloxane), poly(bisphenol A-2-phenyl-3,3'-bis(4-hydroxyphenyl) phthalimidine carbonate), poly(bisphenol A-1,1-bis(4-hydroxy-3-methylphenyl)cyclohexane carbonate), or a combination comprising at least one of the foregoing; and the flame retardant polycarbonate comprises a brominated polycarbonate.

Aspect 3: The process of aspect 1 or 2, wherein the first solution comprises 10 to 30 weight percent, or 15 to 25 weight percent, or 17 to 25 weight percent, or 19 to 25 weight percent of the polycarbonate or the flame retardant polycarbonate, each based on the total weight of the polycarbonate or the flame retardant polycarbonate and the organic solvent.

Aspect 4: The process of any one or more of aspects 1 to 3, wherein the phosphorus-containing flame retardant comprises an aromatic group, a phosphorus-nitrogen bond, or a combination comprising at least one of the foregoing, preferably wherein the phosphorus-containing flame retardant comprises a monomeric or polymeric phosphate, phosphite, phosphonate, phosphinate, phosphine oxide, or phosphine, each containing a $C_{3-30}$ aromatic group optionally comprising up to three heteroatoms in an aromatic ring, a phosphazene, phosphorus ester amide, phosphoric acid amide, phosphonic acid amide, phosphinic acid amide, tris(aziridinyl) phosphine oxide, or a combination comprising at least one of the foregoing, more preferably wherein the phosphorus-containing flame retardant comprises a polyphosphonate-co-carbonate, phosphorus-containing homopolymer, resorcinol diphosphate, bisphenol A bis(diphenyl phosphate), triphenyl phosphate, resorcinol bis(diphenyl phosphate), tricresyl phosphate, a phenol/bi-phenol polyphosphate, phenoxyphosphazene, or a combination comprising at least one of the foregoing.

Aspect 5: The process of any one or more of aspects 1 to 4, wherein the phosphorus-containing flame retardant is present in the first solution in an amount effective to provide 0.05 to 5 weight percent of phosphorus, or 0.1 to 4.0 weight percent, or 0.2 to 3.0 weight percent of phosphorus, based on the combined weight of the polycarbonate and the phosphorus-containing flame retardant.

Aspect 6: The process of any one or more of aspects 1 to 6, wherein a boiling point of the organic solvent is less than 100° C., and wherein the organic solvent is substantially immiscible with water, preferably wherein the organic solvent comprises methylene chloride, chloroform, ethylene dichloride, or a combination comprising at least one of the foregoing, preferably methylene chloride.

Aspect 7: The process of any one or more of aspects 1 to 6, wherein the surfactant comprises an anionic surfactant, a biopolymer surfactant, or a combination comprising at least one of the foregoing, wherein the anionic surfactant is preferably a ($C_{8-36}$alkyl)benzene sulfonate, ($C_{8-36}$alkyl) sulfonate, mono- or di($C_{8-36}$alkyl) sulfosuccinate, ($C_{8-36}$alkyl ether) sulfate, ($C_{8-36}$)alkyl ether sulfonate, perfluoro($C_{2-12}$alkyl) sulfate, or perfluoro($C_{2-12}$carboxylate), more preferably wherein the anionic surfactant is sodium dodecyl sulfate, sodium dodecyl benzene sulfonate, sodium lauryl sulfate, sodium laureth sulfate, sodium dioctyl sulfosuccinate, sodium dihexyl sulfosuccinate, perfluorooctane sulfonate, or perfluorooctanoic acid; and wherein the biopolymer is preferably gelatin, more preferably wherein the gelatin is type A gelatin, type B gelatin, or a combination comprising at least one of the foregoing, most preferably wherein the gelatin is type B gelatin.

Aspect 8: The process of any one or more of aspects 1 to 7, wherein a weight ratio of the polycarbonate to the phosphorus-containing flame retardant is 99:1 to 50:50, or 98:2 to 75:25, or 97:3 to 67:33; the emulsion comprises water in a water to organic solvent weight ratio of greater than or equal to 0.4:1 to 1.25:1, or 0.5:1 to 1:1.5, or 0.6:1 to 1:1, or 0.8:1 to 1:1; and the emulsion comprises the surfactant in a surfactant to polycarbonate weight ratio of 0.008:1 to 0.04:1.

Aspect 9: The process of any one or more of aspects 1 to 8, wherein removing at least a portion of the organic solvent comprises exposing the emulsion to heat by adding the emulsion into a receiving water, wherein the receiving water is at a temperature of 25 to 90° C., or 40 to 70° C., or 40 to 60° C.

Aspect 10: The process of any one or more of aspects 1 to 8, wherein removing at least a portion of the organic solvent comprises exposing the emulsion to heat by heating the emulsion to a temperature of 25 to 90° C., or 40 to 80° C., or 40 to 70° C. to provide the slurry, optionally at a reduced pressure of less than 1000 millibar.

Aspect 11: The process of aspect 10, wherein the heating is conducted until 70% to 95% of the organic solvent is removed to provide the slurry; and the method further comprises agitating the slurry without heating to remove the remaining organic solvent.

Aspect 12: The process of any one or more of aspects 1 to 8, wherein removing at least a portion of the organic solvent comprises purging the emulsion with air, nitrogen, argon, or a combination comprising at least one of the foregoing in the absence of heat.

Aspect 13: The process of any one or more of aspects 1 to 12, further comprising passing the aqueous slurry comprising the plurality of particles through a filter, to provide micronized particles having at least one of: a Dv90 of 5 to 140 micrometers, or 10 to 80 micrometers, or 20 to 60 micrometers; a Dv50 of 3 to 60 micrometers, or 5 to 40 micrometers, or 8 to 25 micrometers; a Dv10 of 0.1 to 20 micrometers, or 2 to 15 micrometers, or 3 to 10 micrometers; or a particle size distribution span of 1.05 to 3.5, or of 1.1 to 3.1, or of 1.15 to 2.5.

Aspect 14: The process of any one or more of aspects 1 to 13, wherein the polycarbonate particles are recovered in a yield greater than 25%, or greater than 50%, or greater than 75%, or greater than 90%.

Aspect 15: The process of any one or more of aspects 1 to 14, wherein the polycarbonate particles have a glass transition temperature of less than or equal to 140° C., or less than or equal to 130° C., or less than or equal to 120° C., or 100 to 110° C.

Aspect 16: The process of any one or more of aspects 1 to 15, wherein the polycarbonate particles have a residual gelatin content of less than 1000 parts per million, or less than 500 parts per millions, or less than 250 parts per million, or less than 150 parts per million.

Aspect 17: The process of any one or more of aspects 1 to 16, wherein the polycarbonate particles retain greater than 90% of the phosphorus-containing flame retardant present in the first solution.

Aspect 18: Polycarbonate particles comprising a phosphorus-containing flame retardant, produced by the process of any one or more of aspects 1 to 17.

Aspect 19: Polycarbonate particles comprising: a polycarbonate and a phosphorus-containing flame retardant or a flame retardant polycarbonate; wherein the polycarbonate particles have at least one of: a Dv90 of 5 to 140 micrometers, or 10 to 80 micrometers, or 20 to 60 micrometers; a Dv50 of 3 to 60 micrometers, or 5 to 40 micrometers, or 8 to 25 micrometers; a Dv10 of 0.1 to 20 micrometers, or 2 to 15 micrometers, or 3 to 10 micrometers; or a particle size distribution span of 1.05 to 3.5, or of 1.1 to 3.1, or of 1.15 to 2.5; wherein the polycarbonate particles have a glass transition temperature of less than or equal to 140° C., or less than or equal to 130° C., or less than or equal to 120° C., or 100 to 110° C.; and wherein the polycarbonate particles have a residual gelatin content of less than 1000 parts per million, or less than 500 parts per millions, or less than 250 parts per million, or less than 150 parts per million.

Aspect 20: An article comprising the polycarbonate particles of aspect 18 or 19.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles. All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(=O)$_2$-alkyl), a C$_{6-12}$ aryl sulfonyl (—S(=O)$_2$-aryl) a thiol (—SH), a thiocyano (—SCN), a tosyl (CH$_3$C$_6$H$_4$SO$_2$—), a C$_{3-12}$ cycloalkyl, a C$_{2-12}$ alkenyl, a C$_{5-12}$ cycloalkenyl, a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A process for the manufacture of polycarbonate particles, the process comprising:
  combining a first solution comprising
    (i) a polycarbonate and a phosphorus-containing flame retardant, and
    (ii) an organic solvent
  with a second solution comprising
    (i) a surfactant and
    (ii) an aqueous solvent substantially immiscible with the organic solvent, under conditions of shear and temperature effective to provide an emulsion; and
  removing at least a portion of the organic solvent to provide an aqueous slurry comprising a plurality of particles comprising the polycarbonate and the phosphorus-containing flame retardant.

2. The process of claim 1, wherein
  the polycarbonate is a homopolycarbonate, a copolycarbonate, a polycarbonate copolymer, or a combination comprising at least one of the foregoing.

3. The process of claim 1, wherein the first solution comprises 10 to 30 weight percent of the polycarbonate, based on the total weight of the polycarbonate and the organic solvent.

4. The process of claim 1, wherein the phosphorus-containing flame retardant comprises an aromatic group, a phosphorus-nitrogen bond, or a combination comprising at least one of the foregoing.

5. The process of claim 1, wherein the phosphorus-containing flame retardant is present in the first solution in an amount effective to provide 0.05 to 5 weight percent of phosphorus, based on the combined weight of the polycarbonate and the phosphorus-containing flame retardant.

6. The process of claim 1, wherein a boiling point of the organic solvent is less than 100° C., and wherein the organic solvent is substantially immiscible with water.

7. The process of claim 1, wherein the surfactant comprises an anionic surfactant, a biopolymer surfactant, or a combination comprising at least one of the foregoing,
  wherein the anionic surfactant is a ($C_{8-36}$alkyl)benzene sulfonate, ($C_{8-36}$alkyl) sulfonate, mono- or di($C_{8-36}$alkyl) sulfosuccinate, ($C_{8-36}$alkyl ether) sulfate, ($C_{8-36}$) alkyl ether sulfonate, perfluoro($C_{2-12}$alkyl) sulfate, or perfluoro($C_{2-12}$carboxylate); and
  wherein the biopolymer is gelatin.

8. The process of claim 1, wherein
  a weight ratio of the polycarbonate to the phosphorus-containing flame retardant is 99:1 to 50:50;
  the emulsion comprises water in a water to organic solvent weight ratio of greater than or equal to 0.4:1 to 1.25:1; and
  the emulsion comprises the surfactant in a surfactant to polycarbonate weight ratio of 0.008:1 to 0.04:1.

9. The process of claim 1, wherein removing at least a portion of the organic solvent comprises exposing the emulsion to heat by adding the emulsion into a receiving water, wherein the receiving water is at a temperature of 25 to 90° C.

10. The process of claim 1, wherein removing at least a portion of the organic solvent comprises exposing the emulsion to heat by heating the emulsion to a temperature of 25 to 90° C. to provide the slurry.

11. The process of claim 10, wherein the heating is conducted until 70% to 95% of the organic solvent is removed to provide the slurry; and the method further comprises agitating the slurry without heating to remove the remaining organic solvent.

12. The process of claim 1, wherein removing at least a portion of the organic solvent comprises purging the emulsion with air, nitrogen, argon, or a combination comprising at least one of the foregoing in the absence of heat.

13. The process of claim 1, further comprising passing the aqueous slurry comprising the plurality of particles through a filter, to provide micronized particles having at least one of:
  a Dv90 of 5 to 140 micrometers;
  a Dv50 of 3 to 60 micrometers;
  a Dv10 of 0.1 to 20 micrometers; or
  a particle size distribution span of 1.05 to 3.5;
  wherein Dv90, Dv50, Dv10 and particle size distribution span are determined by laser diffraction.

14. The process of claim 1, wherein the polycarbonate particles are recovered in a yield greater than 25%.

15. The process of claim 1, wherein the polycarbonate particles have a glass transition temperature of less than or equal to 140° C., determined using differential scanning calorimetry.

16. The process of claim 7, wherein the polycarbonate particles have a residual gelatin content of less than 1000 parts per million.

17. The process of claim 1, wherein the polycarbonate particles retain greater than 90% of the phosphorus-containing flame retardant present in the first solution.

18. Polycarbonate particles comprising a phosphorus-containing flame retardant, produced by the process of claim 1;
  wherein the polycarbonate particles have at least one of:
    a Dv90 of 5 to 140 micrometers;
    a Dv50 of 3 to 60 micrometers;
    a Dv10 of 0.1 to 20 micrometers; or
    a particle size distribution span of 1.05 to 3.5; and
    wherein Dv90, Dv50, Dv10 and particle size distribution span are determined by laser diffraction.

19. Polycarbonate particles comprising:
  a polycarbonate and resorcinol bis (diphenyl phosphate);
  wherein the polycarbonate particles have at least one of:
    a Dv90 of 5 to 140 micrometers;
    a Dv50 of 3 to 60 micrometers;
    a Dv10 of 0.1 to 20 micrometers; or
    a particle size distribution span of 1.05 to 3.5;
  wherein Dv90, Dv50, Dv10 and particle size distribution span are determined by laser diffraction;
  wherein the polycarbonate particles have a glass transition temperature of less than or equal to 140° C., determined using differential scanning calorimetry; and
  wherein the polycarbonate particles have a residual gelatin content of less than 1000 parts per million.

20. An article comprising the polycarbonate particles of claim 18.

* * * * *